United States Patent
Tanaka et al.

[11] Patent Number: 5,810,953
[45] Date of Patent: Sep. 22, 1998

[54] PNEUMATIC TIRE INCLUDING TWO GROOVES AND TWO RUBBER PARTS

[75] Inventors: Masatoshi Tanaka, Takarazuka; Sumio Takatsu, Tokyo-to, both of Japan

[73] Assignee: Sumitomo Rubber Industries, Ltd., Hyogo-ken, Japan

[21] Appl. No.: 641,177

[22] Filed: Apr. 30, 1996

Related U.S. Application Data

[62] Division of Ser. No. 135,551, Oct. 14, 1993.

[30] Foreign Application Priority Data

Oct. 14, 1992 [JP] Japan ................................... 4-302955
Jul. 28, 1993 [JP] Japan ................................... 5-207197
Aug. 5, 1993 [JP] Japan ................................... 5-215015

[51] Int. Cl.$^6$ .............................. B60C 1/00; B60C 11/00; B60C 101/00
[52] U.S. Cl. .................................. 152/209 R; 152/209 D
[58] Field of Search ........................... 152/209 R, 209 D, 152/454

[56] References Cited

U.S. PATENT DOCUMENTS

| D. 330,882 | 11/1992 | Hasegawa | D2/147 |
|---|---|---|---|
| 3,931,844 | 1/1976 | Mirtain | 152/209 R |
| 4,044,810 | 8/1977 | Taniguchi et al. | . |
| 4,385,653 | 5/1983 | Okazaki et al. | 152/209 R |
| 4,947,911 | 8/1990 | Ushikabo et al. | 152/209 R |
| 4,986,324 | 1/1991 | Suzuki et al. | 152/209 R |
| 5,046,542 | 9/1991 | Ohta et al. | 152/209 R |
| 5,109,902 | 5/1992 | Kobayashi | 152/209 R |
| 5,225,011 | 7/1993 | Takino et al. | 152/209 R |
| 5,323,824 | 6/1994 | Swift et al. | 152/209 R |
| 5,337,815 | 8/1994 | Graas | 152/209 R |

FOREIGN PATENT DOCUMENTS

| 435620 | 7/1991 | European Pat. Off. | 152/209 R |
|---|---|---|---|
| 634594 | 2/1928 | France . | |
| 87302 | 4/1988 | Japan | 152/209 R |
| 0045203 | 2/1990 | Japan | 152/209 R |
| 2-182505 | 7/1990 | Japan | 152/209 R |
| 3-038408 | 2/1991 | Japan | 152/209 R |
| 3-074208 | 3/1991 | Japan | 152/209 R |
| 3-169719 | 7/1991 | Japan | 152/209 R |
| 3525394 | 1/1986 | Netherlands . | |
| 1255952 | 12/1971 | United Kingdom | 152/209 R |
| 2-221877 | 2/1990 | United Kingdom | 152/209 R |

OTHER PUBLICATIONS

Patent Abstract of Japan, vol. 016, No. 299 (M–1274) 2 Jul. 1992 & JP–A–04 081 305 (Bridgestone Corp.) 16 Mar. 1992.
Patent Abstract of Japan, vol. 016, No. 041 (M–1206) 31 Jan. 1992 & JP–A–03 246 104 (Bridgestone Corp.).
"Tire Materials & Construction," K. Fost, *Automotive Engineering*, Oct. 1992.

Primary Examiner—Steven D. Maki

[57] ABSTRACT

A pneumatic tire has a tread part with two circumferential grooves continuously extending in the circumferential direction in either side of the tire's equator so as to divide the tread part into a pair of shoulder parts and a central part. The central part has a surface utilizing successive convex curves composed of a pair of inner groove walls, which extend inside in the axial direction of tire along a curve convexed outwardly in the radial direction from inner bottom edges of the circumferential grooves, and a central ground-contact surface, which is smoothly connected between the pair of the inner groove walls. The central ground-contact surface is substantially in contact with a virtual tread line connected between outer surfaces of the shoulder parts.

7 Claims, 20 Drawing Sheets

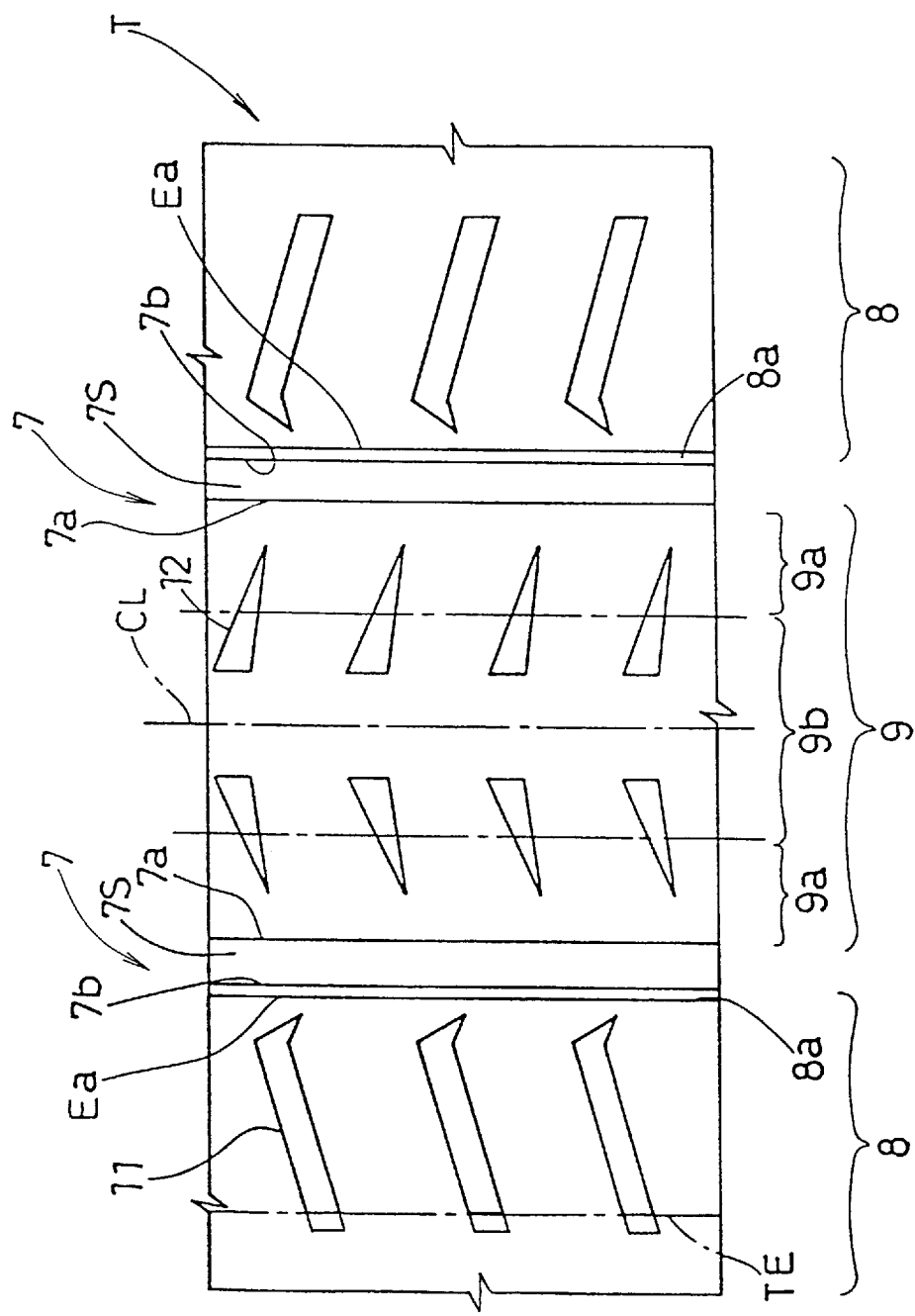

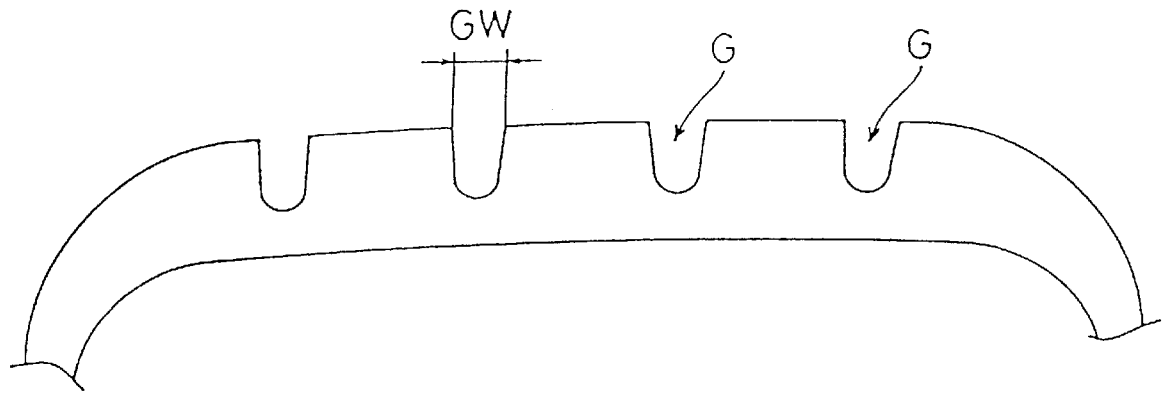
Fig. 20
CONVENTIONAL

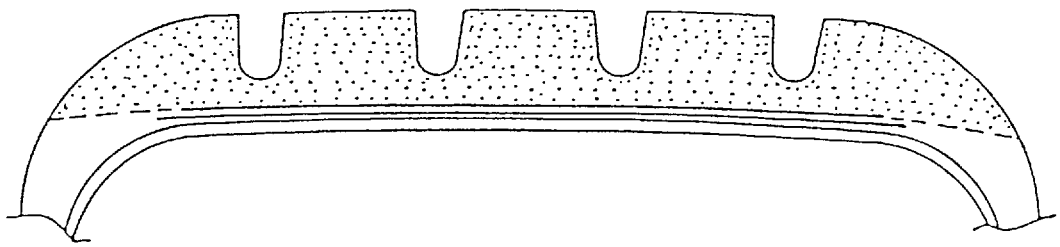
Fig. 21
CONVENTIONAL
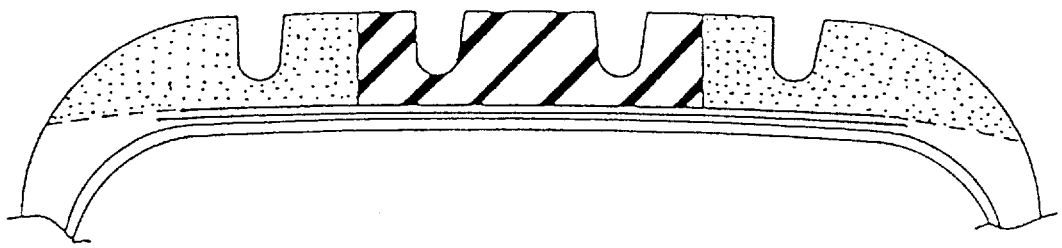
Fig. 22
CONVENTIONAL

Fig. 29
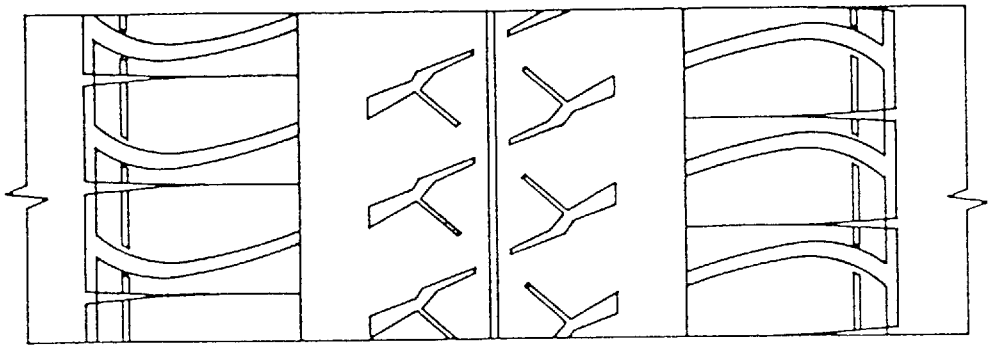
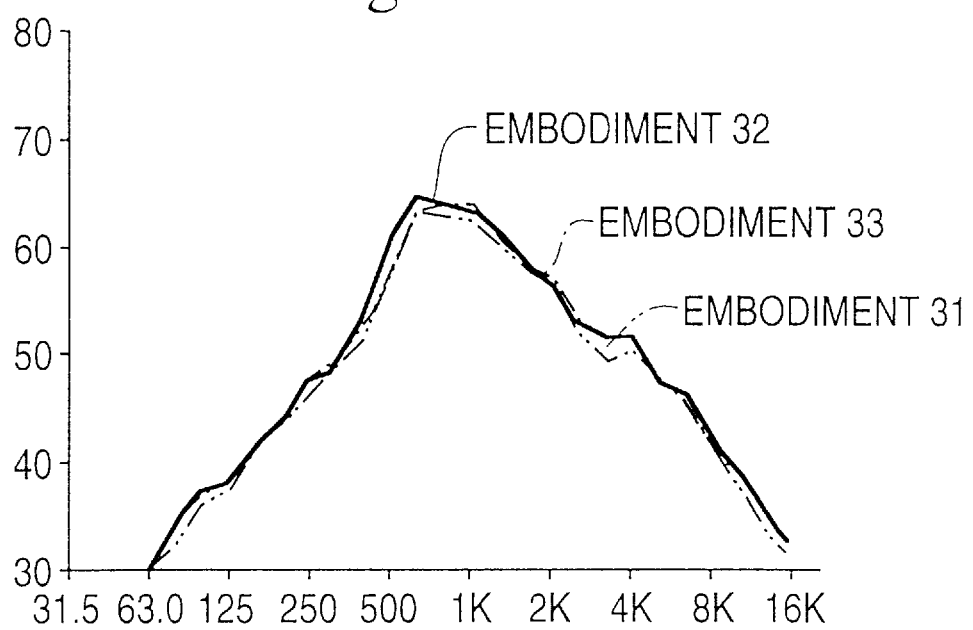

PNEUMATIC TIRE INCLUDING TWO GROOVES AND TWO RUBBER PARTS

This application is a divisional of copending application Ser. No. 08/135.551, filed on Oct. 14, 1993,.

BACKGROUND OF THE INVENTION

The present invention relates to a pneumatic tire that is preferably applicable as a low aspect radial tire for passenger vehicles, in particular, and capable of achieving a higher wet grip performance reducing tire noises and maintaining the dry grip performance.

FIELD OF THE INVENTION

Recently, as automobiles are operated more silently, a noise caused by a tire has come to contribute at a higher ratio to a total noise level of an automobile, and its reduction is demanded. Such noise reduction is specifically desired at a range about 1 kHz that is easily heard by a human ear, and sounds due to a columnar resonance is one of main sound sources of such high frequency range.

On the other hand, in order to maintain the wet grip performance, a tire tread is generally provided with plural circumferential grooves continuously extending in the circumferential direction of tire.

In such a tire, when it is in contact with the ground, a kind of air column is formed by the road surface and the circumferential groove. Then a sound of specific wavelength, that is, a double wave length of the air column is caused by an airflow within the column during running.

Such phenomenon is referred to as a columnar resonance, and provides a main source of noises at 800 to 1.2 kHz. A wavelength of the columnar resonance sound is approximately at a constant frequency regardless of the tire's speed, and increases sounds inside and outside an automobile.

In order to prevent the columnar resonance, although reduction of the number or volume of the circumferential grooves is known, such reduction leads to a lower wet grip performance.

On the other hand, although the wet grip performance can be increased contrarily by increasing the number or volume of circumferential grooves, a simple increase causes reduction of the dry grip performance, because a ground-contact area is reduced, and reduction of the steering stability as a rigidity of tread pattern is reduced, in addition to the increase of tire noise.

Conventionally, tire's performances have been adjusted by sacrificing any of such inconsistent performances.

SUMMARY OF THE INVENTION

It is hence a primary object of the invention to provide a pneumatic tire capable of improving the wet grip performance without affecting the dry grip performance and the steering stability, and reducing tire noises.

According to one aspect of the present invention, a pneumatic tire has a tread part with two circumferential grooves continuously extending in the circumferential direction in either side of the tire's equator so as to divide the tread part into a pair of shoulder parts, which are located outside outer bottom edges of the circumferential grooves in the axial direction of tire, and a central part, which is located between inner bottom edges of the circumferential grooves in the axial direction of tire. The central part has a surface utilizing successive convex curves composed of a pair of inner groove walls and a central ground-contact surface. The pair of inner groove walls extend inside in the axial direction of tire along a curve convexed outwardly in the radial direction from the inner bottom edges of the circumferential grooves. The central ground-contact surface is smoothly connected between the pair of the inner groove walls. The central ground-contact surface is substantially in contact with a virtual tread line connected between outer surfaces of the shoulder parts.

A tread rubber of the tread part may be composed of a first rubber composition of a loss tangent tan $\delta 1$ at 0.01 to 0.35 and a second rubber composition of a loss tangent tan $\delta 2$ at 1.2 to 10 times the loss tangent tan $\delta 1$. The first rubber composition is provided at least in a radially inner region of the central part so as to be adjacent to a belt layer. The second rubber composition is provided at least in a radially outer region of at least one shoulder part so as to be adjacent to a tread surface.

The central ground-contact surface may be provided with a circumferential radiation groove continuously extending on the tire's equator and having a groove depth D1 of 0.4 to 0.9 times a groove depth D of the circumferential groove and a groove width W1 of 5 mm or less.

BRIEF DESCRIPTION OF THE DRAWINGS

An embodiment of the present invention will now be described, by way of example, referring to the attached diagrammatic drawings, in which:

FIG. 3 is a partial flat view showing an example of tread pattern.

FIG. 20 is a diagram showing an example of a tread profile of a conventional tire.

FIG. 21 is a sectional view showing a tread rubber structure of a conventional tire 1 in table 1.

FIG. 22 is a sectional view showing a tread rubber structure of a comparison tire 1, 2, 3 and 4 in table 1.

FIG. 29 is a flat view showing still another example of radiation grooves.

FIG. 31 is a diagram showing a result of noise test.

DETAILED DESCRIPTION OF THE INVENTION

Figure 1:
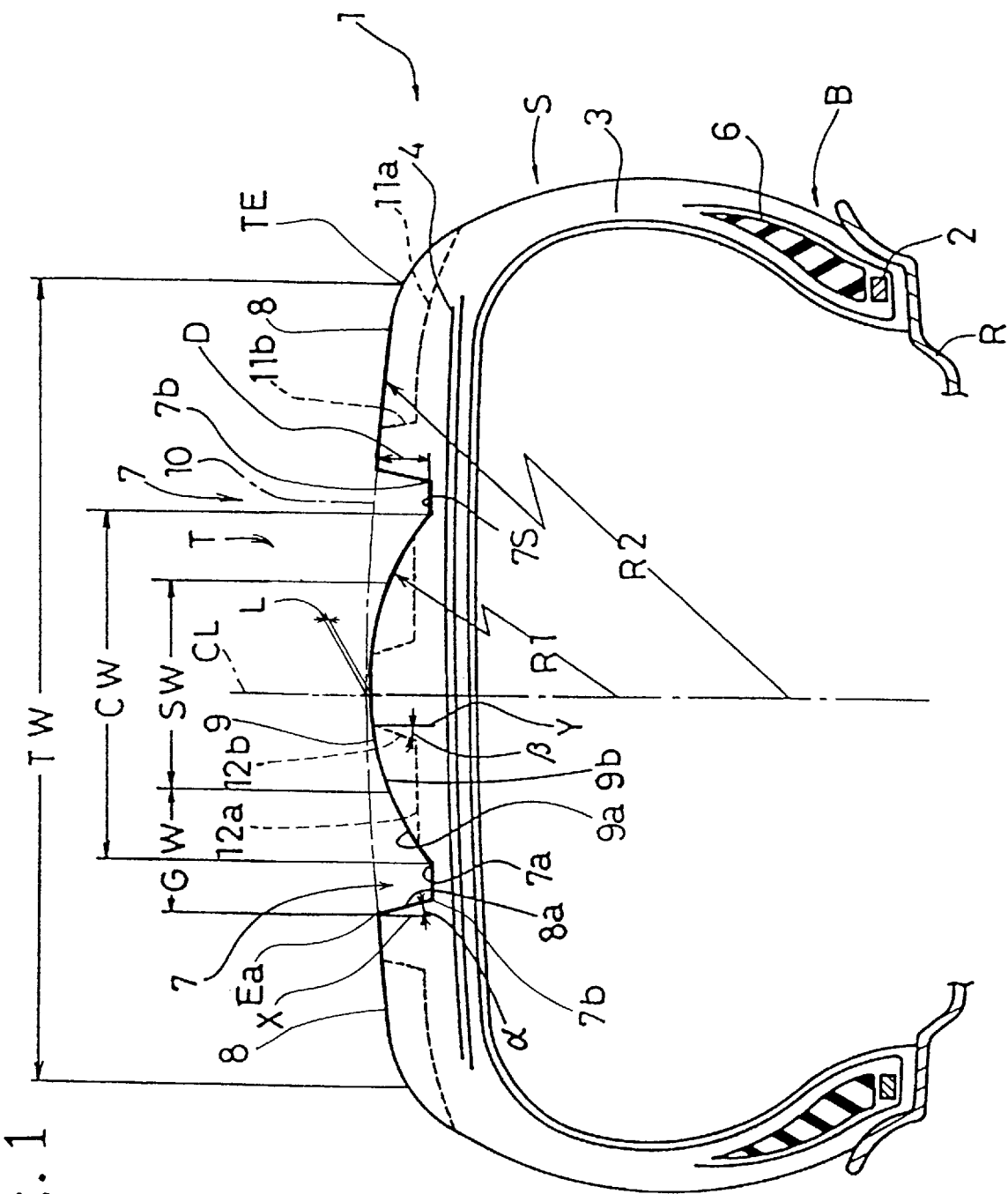
FIG. 1 is a sectional view showing an embodiment of the invention.

FIG. 1 shows a sectional view of an embodiment of the invention in a standard state, mounted on a standard rim R and inflated with a standard inflation pressure specified by the JATMA standard.

A tire 1 comprises a pair of bead parts B each having a bead core 2, sidewall parts S extending from the bead parts B outwardly in the radial direction of tire, and a tread part T for linking between their outer ends. And this embodiment is approximately 0.4 to 0.6 in the aspect ratio of the tire sectional height to the tire width, and is formed as a low aspect radial tire for passenger vehicles.

Between the bead parts B, a carcass 3 with a radial structure is straddling, of which both ends of the main body part extending from the tread part T through the sidewall parts S are folded back from inside to outside around the bear core 2, and a belt layer 4 is provided on the carcass 3 and radially inward of the tread part T.

In addition, a bead apex rubber 6 extending radially outward from the bead core 2 is provided between a main part of the carcass 3 and a folded back part thereof so as to maintain the shape and rigidity of the bead part B.

The belt layer 4 comprises plural belt plies 4A of cords coated by a topping rubber. The cords have a high tensile rigidity, such as steel and aromatic polyamide, and are aligned in parallel with each other.

Figure 2A:
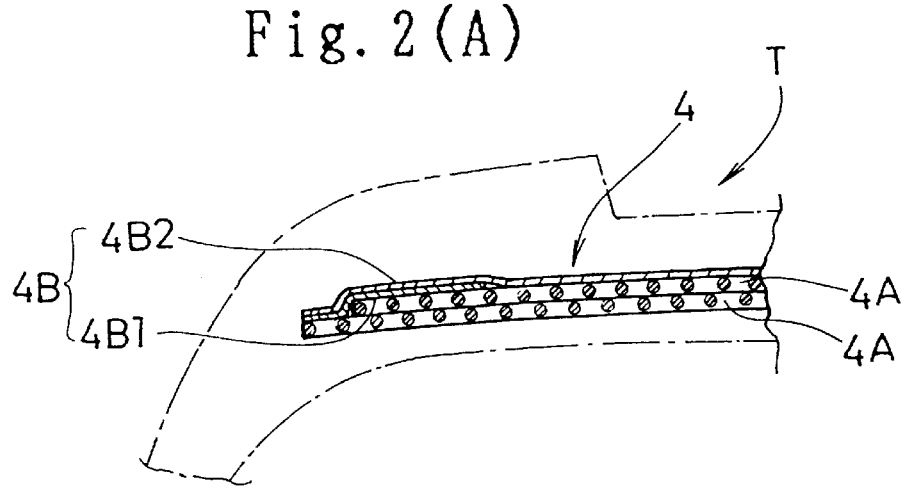
FIG. 2(A) is an enlarged partial sectional view showing an example of a belt layer.

In the embodiment, the belt layer 4 includes, as shown in FIG. 2(A), a band ply 4B placed outside a belt ply 4A for controlling lifting of the belt ply 4A that is associated with high-speed driving.

In each belt ply 4A, the cords are aligned at a relatively small angle of 15 to 30 degrees to the tire's equator so as to be crossed by each other between the plies.

The band ply 4B comprises an edge band 4B1 covering the belt ply 4A in an outer end part thereof, and a full band 4B2 placed outside the edge band and covering the belt ply together with the edge band 4B1. The bands 4B1, 4B2 are formed by spirally winding nylon band cords, for example, at an angle of 5 degrees or less to the tire's equator.

Figure 2B:
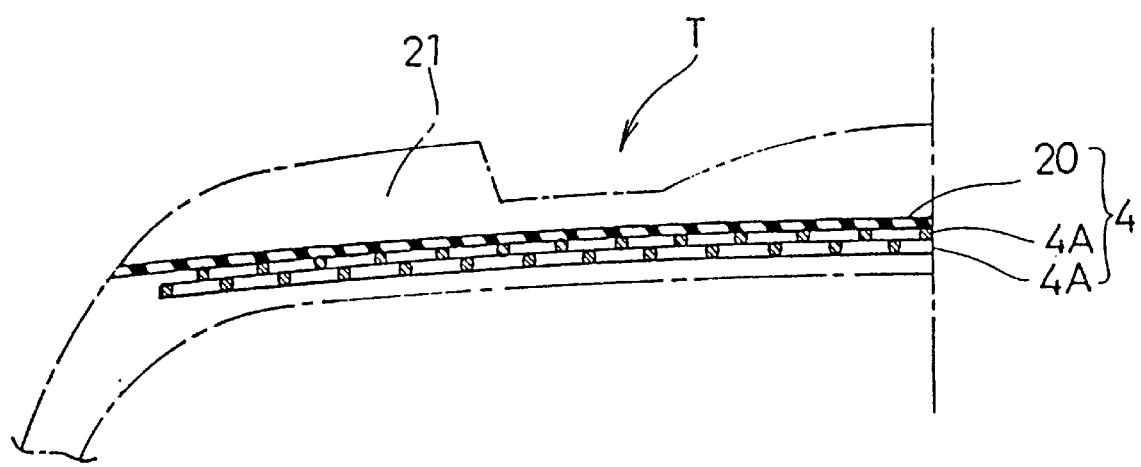
FIG. 2(B) is a sectional view showing an another example of a belt layer.

A coating rubber layer 20 may be formed outside the belt plies 4A or the band ply 4B as shown in FIG. 2(B). The coating rubber layer 20 is a thin rubber layer covering an outer surface of outer belt layer 4 so as to increase adhesion between a tread rubber 21 and belt layer 4. As for the coating rubber layer 20, a rubber composition approximately same as that of the topping rubber is employed. It may be formed over an entire width of the tread, as shown in the FIG. 2(B), or in a same width as that of the outer belt ply. As for the carcass cords, in the case of a tire for passenger vehicles, such organic fiber cords as nylon, rayon and polyester may be generally employed.

The tread part has two wide circumferential grooves 7, which are positioned in either side of the tire's equator CL and continuously extend substantially in the circumferential direction, so that the tread part T is divided into a pair of shoulder parts 8 and a central part 9. The shoulder part 8 is defined as an area outside an outer bottom edge 7b of the circumferential groove 7 in the axial direction of tire. The central part 9 is defined as an area between inner bottom edges 7a of the circumferential grooves 7 in the axial direction of tire. Preferably, the circumferential grooves 7 are positioned symmetrically about the tire's equatorial surface. More preferably, a center of a bottom 7S of the groove 7 is located approximately in the middle of tire's equatorial surface and ground-contact tread end TE. The groove depth D of the groove 7 is 4 to 8% of a ground-contact width TW of the tread such as 7.5 to 15.0 mm, preferably 8.4 mm for a tire of 205/55R15 in size.

The central part 9 has a surface with a smooth convex curve composed of a pair of inner groove walls 9a extending inside in the axial direction of tire along a curve convexed outwardly in the radial direction of tire from the inner bottom edges 7a of the grooves 7 and a central ground-contact surface 9b smoothly connected between the inner groove walls 9a.

Figure 12A:
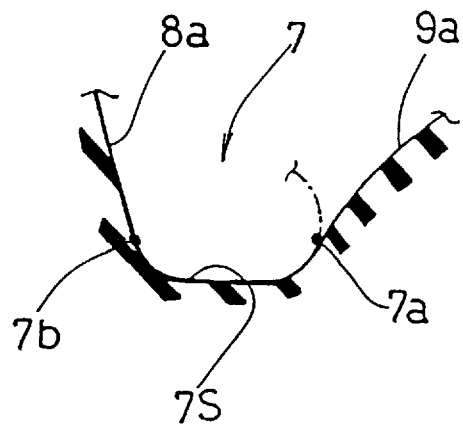
FIG. 12(A) is an enlarged partial sectional view for explanation of groove bottom ends.
Figure 12B:
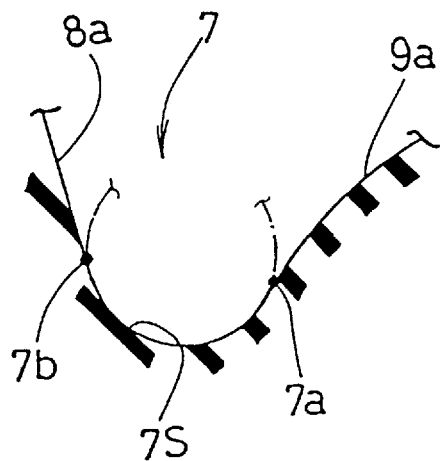
FIG. 12(B) is an enlarged partial sectional view for explanation of groove bottom ends.

The central ground-contact surface 9b is defined as a tread surface area of the central part 9 which comes in contact with the ground when a standard load specified by JATMA standard is applied to a tire in the standard state. The ground-contact tread end TE is an outer end of ground-contact surface of the shoulder part 8, when the standard load is applied. The ground-contact surface of shoulder part 8 is crossed by an outer groove wall 8a extending outside in the radial direction from the outer bottom edge 7b of the groove 7. Thus, the circumferential groove 7 is defined by the groove bottom 7S and inner and outer groove walls 9a, 8a. The groove width GW of the circumferential groove 7 is defined by a distance in the axial direction of tire from an inner end Ea of ground-contact surface of the shoulder part 8 to the upper end of the inner groove wall 9a. The groove bottom edges 7a, 7b may be formed, when the groove bottom 7S is approximately a flat surface as in the embodiment, as bending points between the groove bottom 7S and groove walls 8a, 8b. When the groove bottom 7S is a concaved surface as shown in FIGS. 12(A) and (B), the groove bottom edges 7a, 7b may be formed as bending points or inflection points.

The central ground-contact surface 9b is substantially in contact with a virtual tread line 10 connected between the ground-contact surfaces of the shoulder parts 8 by extending the ground-contact surfaces of the shoulder parts 8.

Here, the expression "substantially in contact" means that a distance L between the central ground-contact surface 9b and the virtual tread line 10 is less than 2% of the ground-contact tread width TW in the tire's equator CL. If it is 2% or more, because a difference between ground-contact pressures of the shoulder part and central part is increased, the grip performance is reduced, and the wear resistance is affected. Thus, it should be preferably 1% or less, more preferably 0.5% or less.

Additionally, the virtual tread line 10 is defined as such an arcuate curve of a single curvature of radius that extends between the inner ends Ea of the ground-contact surfaces of the shoulder part 8 and is in contact with tangent lines to the ground-contact surfaces of the shoulder part 8 at the inner ends Ea thereof. When the tangent is approximately parallel, the virtual tread line 10 is formed as a straight line connecting between the inner ends Ea, Ea.

In the invention, such the convex central part 9 provides a sub-tread having a curvature of radius comparatively small and a width sufficiently narrower than the tire's width in the center of tire, thus, the hydroplaning phenomenon is prevented, and the wet grip performance is increased. It is because a tire with a narrower width and smaller curvature of radius is generally superior in preventing the phenomenon.

Besides, by reducing the curvature of radius of central part 9, specifically that of the central ground-contact surface 9a, the draining performance to outside in both directions is increased, and the draining effect on a wet road is enhanced.

Incidentally, in the case that a curvature of radius R2 of the ground-contact surface of shoulder part 8 is also reduced, the grip performance on a dry road and steering stability in cornering are reduced due to a reduction of ground-contact area. Therefore, the curvature of radius R2 of the ground-contact surface of shoulder part 8 should be comparatively large, preferably 3 times or more of the ground-contact width TW. And it is allowable until the ground-contact surface of shoulder part 8 comes to be approximately a straight line parallel with the tire's axis.

FIG. 1 shows an example with the surface of the central part 9 formed by an arc at a curvature of radius R1. The curvature of radius R1 is sufficiently smaller than the curvature of radius R2 of shoulder part 8, and the convex curve of the central part 9 is inscribed with the virtual tread line 10 in the example. In FIG. 1, the distance L is drawn on purpose to explain the meanings of "substantially in contact".

It is also preferable that the curvature of radius R1 is set within a range of 0.4 to 1.5 times the ground-contact tread width TW. If it is less than 0.4 times, a width SW of the central ground-contact surface 9b is reduced, and the dry grip performance tends to be significantly reduced. If it is more than 1.5 times, the draining effect is insufficient, and the wet grip performance is inferior. Additionally, both curvature of radii R1, R2 should have the center on the tire's equatorial surface. In the embodiment, the shoulder part 8 is provided with an arcuate part with a curvature of radius smaller than the curvature of radius R2 in the vicinity of the ground-contact end TE.

In order to maintain such the performances as dry grip performance, wear resistance and steering stability, the width SW of central ground-contact surface 9b is about 5 to 40%, preferably 15 to 35% of the ground-contact tread width TW. In addition, it is preferable that a width CW of the central part 9, that is a distance between the inner groove bottom edges 7a is about 40 to 55% of the ground-contact tread width TW.

Figure 4:
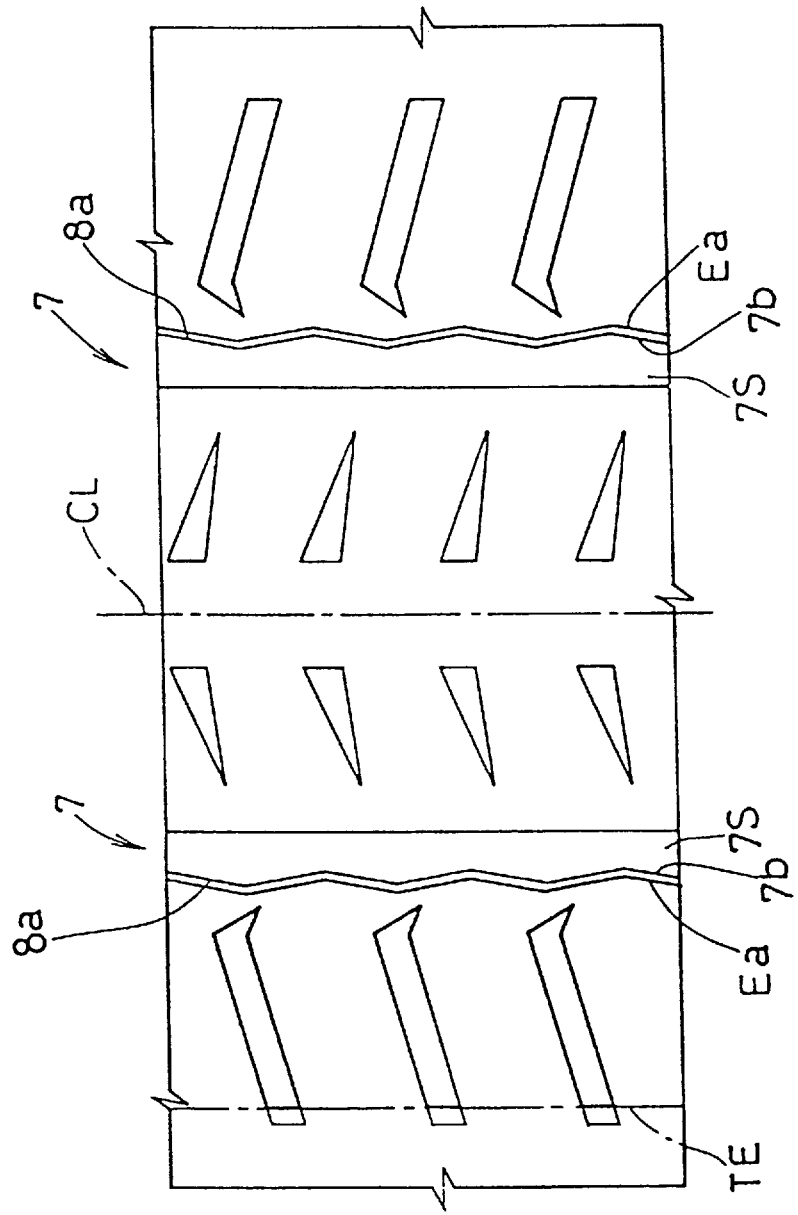
FIG. 4 is a partial plan view of a tread pattern showing another example of a circumferential groove.

Furthermore, in the shoulder part 8, it is desirable that the outer groove wall 8a of the groove 7 is formed in such relatively steep and non-arcuate line as a straight line at an angle δ of 0 to 40 degrees, preferably 5 to 25 degrees to a radial line X of tire, so that an edge effect with a road surface is provided at the inner end Ea of shoulder part 8 with a high ground-contact pressure to help maintain the dry grip performance by increasing a lateral force, and thereby a cornering power. The outer groove wall 8a may be formed in a convex curve similar to the inner groove wall 9a, or extended in a zigzag, as shown in FIG. 4, to increase the traction ability.

Figure 11:
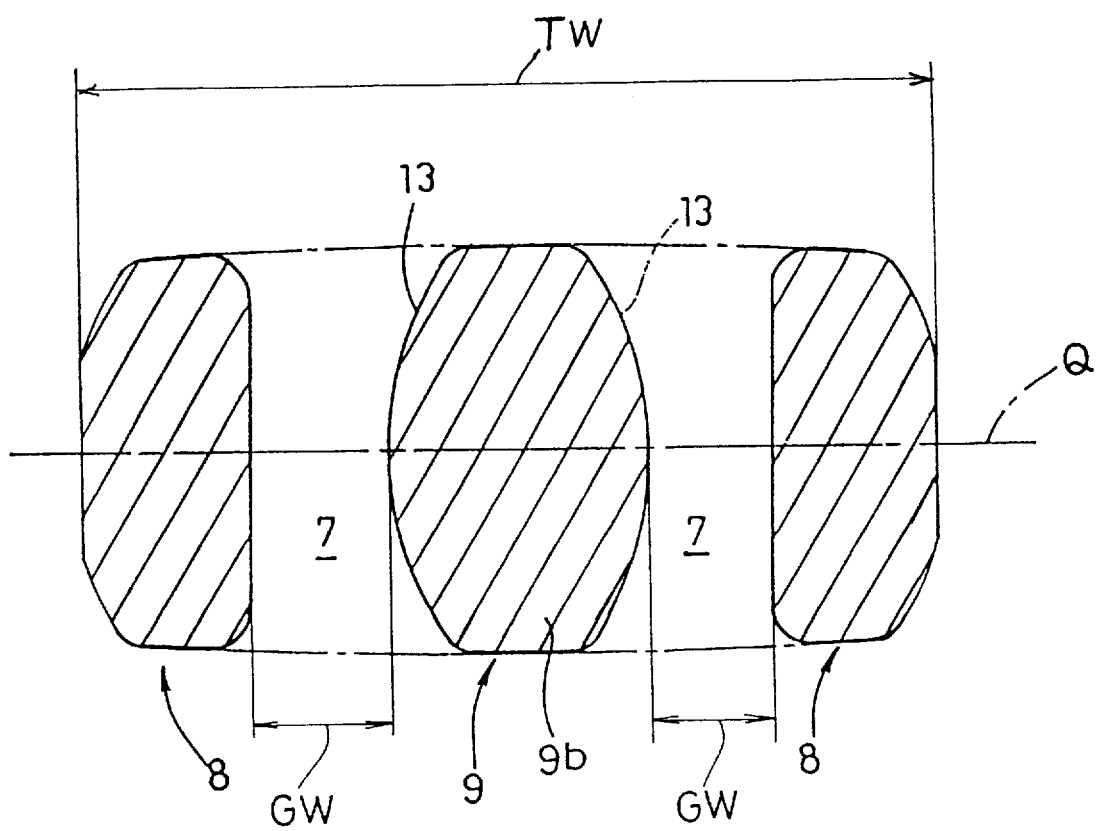
FIG. 11 is a plan view typically showing a foot print of an embodiment of the invention.

Additionally, for reduction of noises due to the air column, the groove width GW of circumferential grooves 7 is 15% or more of the ground-contact tread width TW, when a tire in contact with the ground is applied with the standard load, as shown in FIG. 11.

It has been determined from a result of measuring a passage noise by setting the groove depth of circumferential grooves 7 at a constant value, and changing the groove width ratio GW/TW between the ground-contact tread width TW and the groove width GW of circumferential groove 7. A tire tested was of 205/55 R15 in size, and two each U-shaped circumferential grooves were employed in the tread surfaces.

Figure 7:
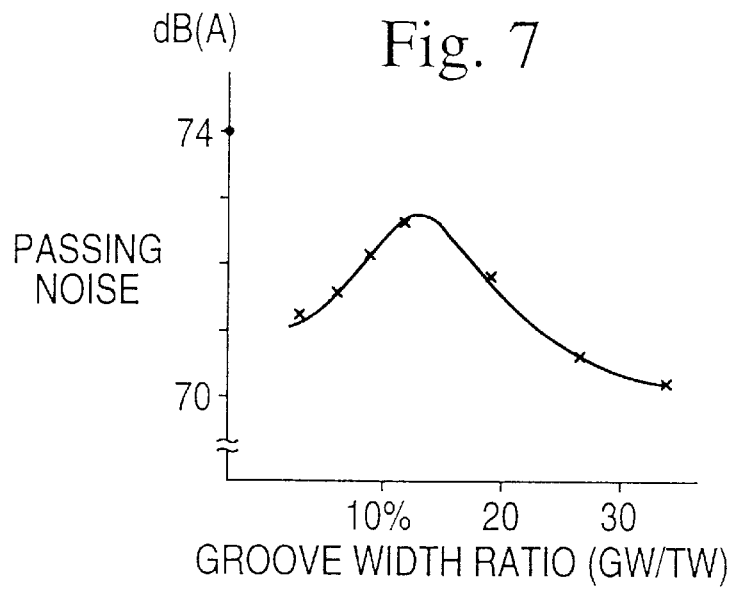
FIG. 7 is a diagram showing a result of a noise test.

In the measurement, the tire was mounted on a domestic passenger vehicle of 2000 cc in cubic capacity, and a passage noise at a speed of 60 km/h was measured according to the JASO standard (a microphone positioned at 7.5 m). As recognized from FIG. 7, the passage noise is increased, as the groove width ratio is increased, to reach the maximum level at the ratio of 13%, and rapidly reduced thereafter. Therefore, the groove ratio is 15% or more, more preferably 20% or more.

Figure 8:
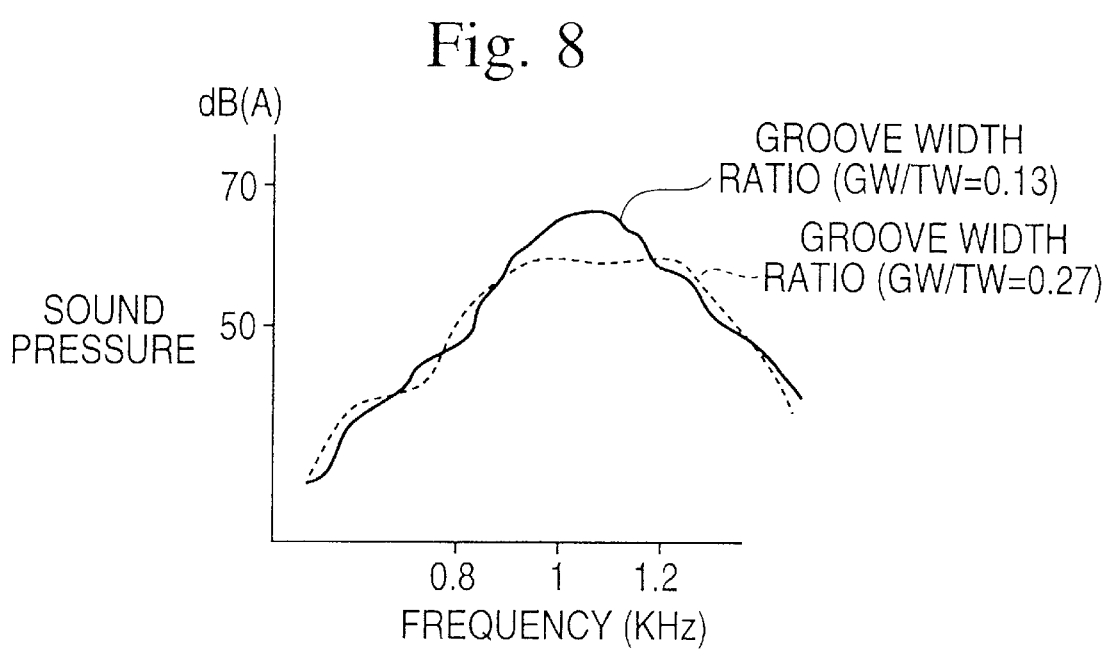
FIG. 8 is a diagram showing a result of a noise test.

Now, FIG. 8 shows a result of frequency analysis about tires with the groove ratio GW/TW at 13% and 27%. It is found that noises of frequency about 1 kHz are reduced with the ratio of 27%.

Figure 9:
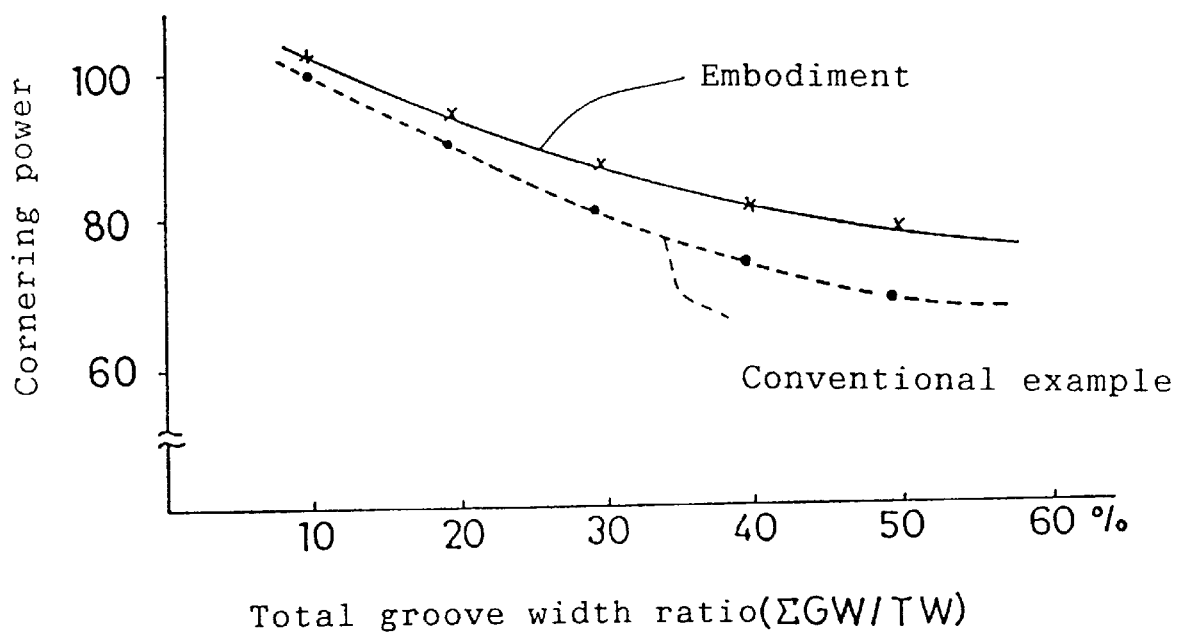
FIG. 9 is a diagram shown a relation between the total groove width ratio and cornering power.

Regarding the circumferential groove 7, it was found that a total groove width ratio 2GW/TW of a total groove width 2GW of the circumferential grooves 7 to the ground-contact tread width TW affects the cornering power and wet grip performance. FIG. 9 shows a result of measuring the cornering power in a tire of the same size with a central part in a form of a single arc as shown in FIG. 1 and a conventional tire with four circumferential grooves G as shown in FIG. 20 by changing the total groove width ratio Σ GW/TW. As the total groove width ratio, a value of the ratio 2GW/TW was employed for the embodiment, and a value of the ratio (Σ GW)/TW for the conventional example. The cornering power was measured on the drum tester in the standard state. It is detected that the embodiment shows a higher value in comparison with the conventional tire. It is considered because, when the total groove width ratio defined as above is constant, the inner groove wall 9a of a convex curve contributes to increasing the tire's lateral rigidity. However, when the total groove width ratio exceeds 50%, the cornering power is significantly reduced.

Figure 10:
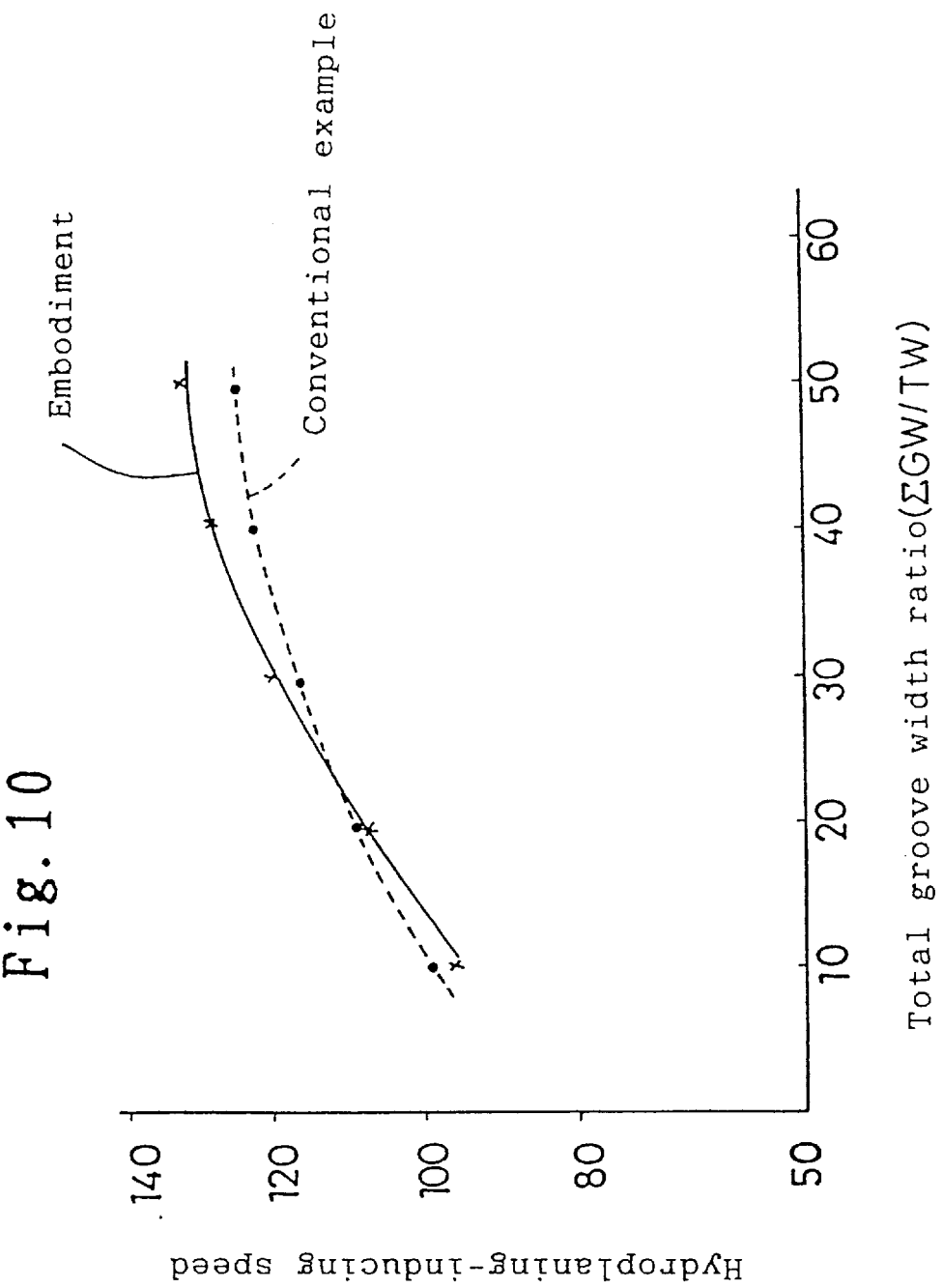
FIG. 10 is a graph showing a relation between the total groove width ratio and hydroplaning-inducing speed.

FIG. 10 shows a result of measuring, in a similar manner, a hydroplaning inducing speed. It is observed that the hydroplaning phenomenon is caused at a higher speed in the embodiment, compared with the conventional tire. It is because the circumferential groove 7 forms a widened part 13 as shown in FIG. 11 in front and back of a ground-contact center Q, when the tire comes in contact with the ground. The widened part 13 increases the draining performance, and prevents occurrence of the columnar resonance in the circumferential groove 7.

Thus, because of the noise, dry grip performance affected by the cornering power and wet grip performance by the hydroplaning phenomenon, the groove width ratio is preferably 15% or more, more preferably 20% or more, and the total groove width ratio 30 to 50%, more preferably 40 to 50%.

Figure 5:
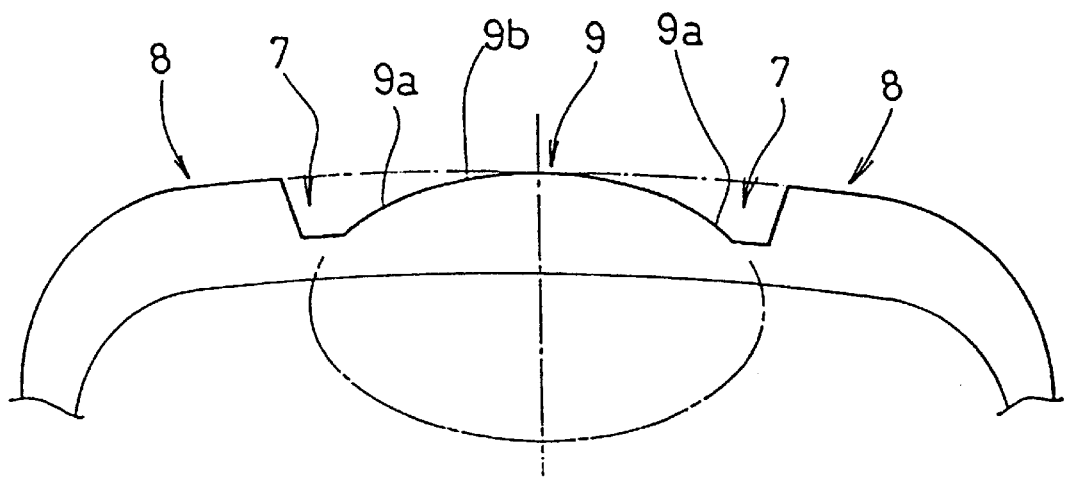
FIG. 5 is a sectional view of a tire showing another example of a central part configuration.

Incidentally, although the surface of the central part 9 is formed by a single arc in the embodiment shown in FIG. 1, it may be formed in a elliptic shape, as shown in FIG. 5, or a curve approximate to an ellipse.

Figure 6:
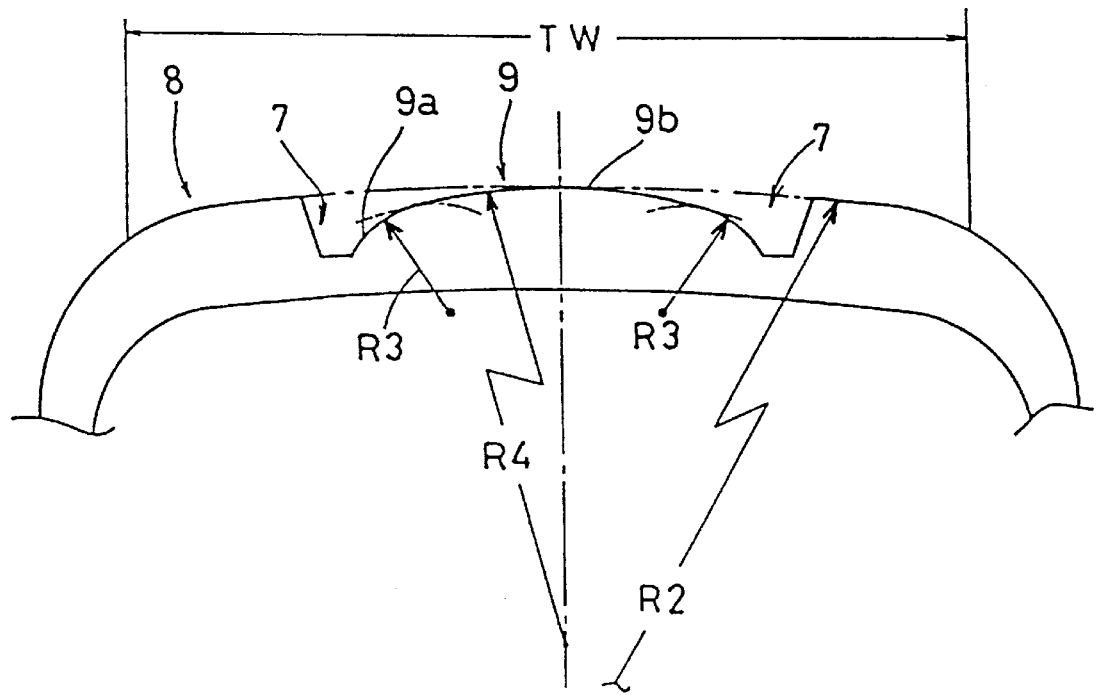
FIG. 6 is a sectional view of a tire showing still another example of a central part configuration.

FIG. 6 shows that the groove wall 9a and the central ground-contact surface 9b have different curvature of radii R3, R4. The curvature of radius R3 is less than the curvature of radius R4 of central ground-contact surface 9b and the curvature of radius R2 of ground-contact surface of the shoulder part, respectively, and the lowest limit thereof is preferably 5% or more of the ground-contact tread width TW. If it is less than 5%, the draining effect tends to be insufficient. The highest limit is at a value identical to the curvature of radius R4, and the central surface is formed by a single arc in such case. The curvature of radius R4 can be close to the curvature of radius R2 so long as the wet grip performance is not inferior.

Additionally, in the right and left groove walls 9a, 9a, the curvature of radius R3 may be different between right and left such that it is larger in one groove wall 9a facing outside the vehicle in mounting a tire than the other for reducing sound radiation to the outside.

Here, in a tire with the central part 9, the heat generated in the central part 9 is comparatively high. And it is preferred to control the heat generation so as to increase the high-speed durability.

Accordingly, in the embodiment, as shown in FIGS. 13 to 18, the tread rubber 21 comprises a first rubber composition 22 with a loss tangent δ 1 at 0.01 to 0.35 and a second rubber composition with a loss tangent δ 2 at 1.2 to 10.0 times of the loss tangent δ 1. A first rubber part 25 using the first rubber composition 22 is provided at least in a radially inner region of the central part 9 so as to be adjacent to the belt layer 4, and a second rubber part 26 using the second rubber composition 23 is provided at least in a radially outer region of at least one shoulder part 8 so as to be adjacent to the tread surface.

In this way, since the first rubber part 25 of central part 9 is formed by the first rubber composition 22 with the loss tangent δ 1 at a lower value, that is, lower in energy loss, and thereby the increase of internal temperature that comes to be excessive in the central part 9, as described above, is effectively controlled, and the high-speed durability is increased.

On the other hand, as the second rubber part 26 of shoulder part 8 that is subjected to a higher ground-contact pressure is formed by the second rubber composition 23 with the loss tangent δ 2 at a higher value, that is, higher in energy loss, and thereby the riding comfort can be increased, and the steering stability in straight-forwarding and turning is maintained in the entire tire with enhancement of the ground tracking performance and grip performance.

Figure 13:
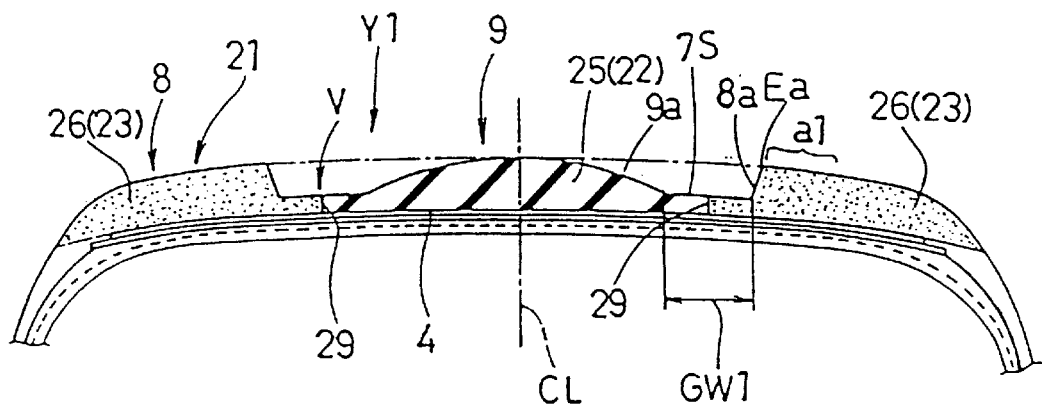
FIG. 13 is a sectional view showing an example of tread rubber structure.
Figure 14:
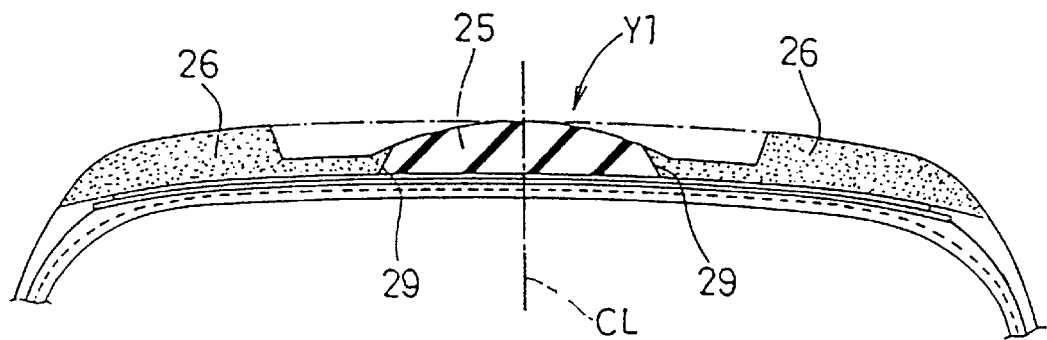
FIG. 14 is a sectional view showing another example of tread rubber structure.
Figure 15:
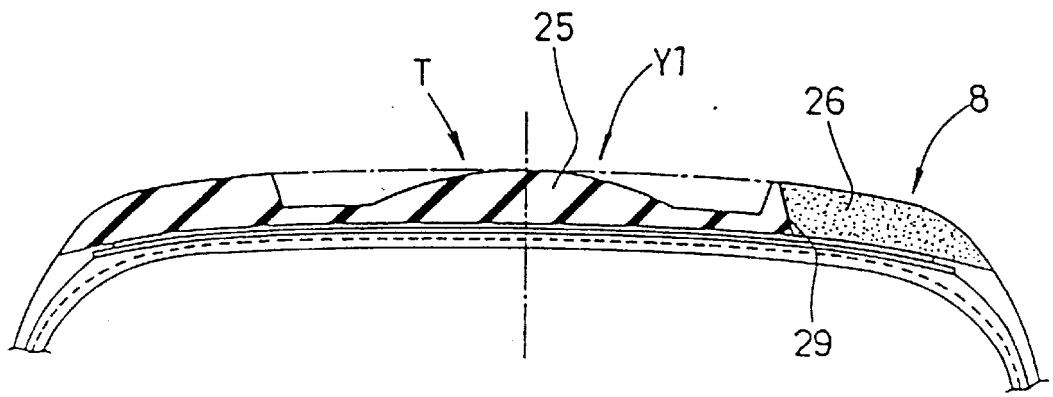
FIG. 15 is a sectional view showing still another example of tread rubber structure.
Figure 16:
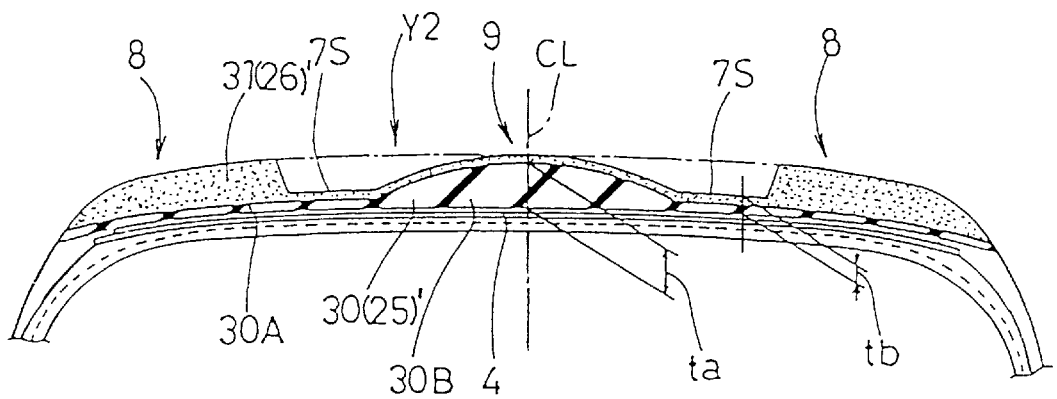
FIG. 16 is a sectional view showing still another example of tread rubber structure.
Figure 17:
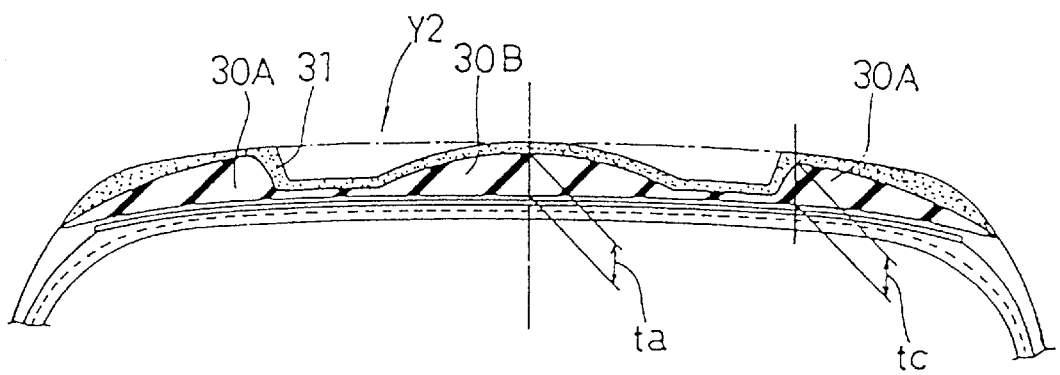
FIG. 17 is a sectional view showing still another example of tread rubber structure.
Figure 18:
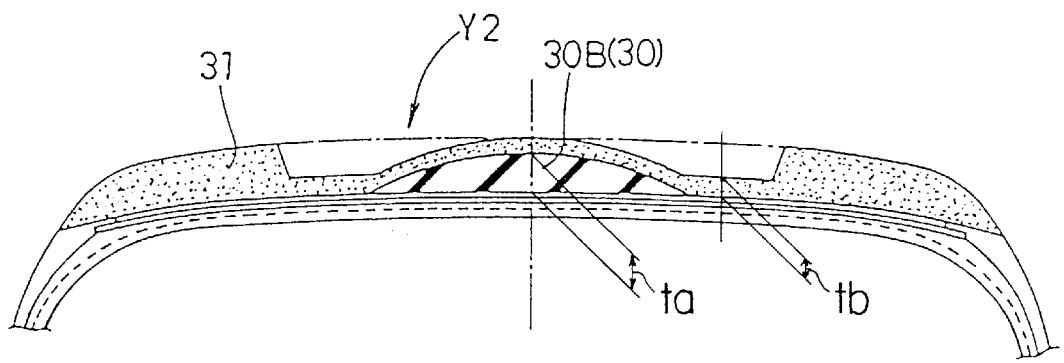
FIG. 18 is a sectional view showing still another example of tread rubber structure.

Now, as for a rubber structure Y of the tread rubber 21, a lateral division type rubber structure Y1 formed by dividing the first and second rubber parts 25 and 26 in the axial direction of tire as shown in FIGS. 13 to 15, and a vertical division type rubber structure Y2 formed by dividing the first and second rubber parts 25 and 26 in the radial direction of tire as shown in FIGS. 16 to 18 may be adopted.

As an example of the lateral division type rubber structure Y1, as shown in FIG. 13, for example, two boundaries 29 extending from origins V on the tread surface to the belt layer 4 are provided in either side of the tire's equator CL, the first rubber part 25 is formed between the boundaries 29, 29, and the second rubber parts 26 are formed outside the boundaries 29.

The origins V, V are located outside the central ground contact surface 9b, that is, on the inner groove wall 9a, on the groove bottom 7s or on the outer surface of the shoulder part 8. And the first rubber part 25 is formed in both of radially inner and outer regions of the central part 9. Therefore, the first rubber part 25 is disposed at least in radially inner region of the central part 9 so as to be adjacent to the belt layer 4. Similarly, each of the second rubber part 29 is also formed in both of radially inner and outer regions of the shoulder part 8, therefore, disposed at least in the radially outer region of at least one of the shoulder parts 8.

The origin V is preferably provided on the groove walls 8a, 9a, on the groove bottom 7S or on an inner end part a1 of the shoulder part 8 spaced outside in the axial direction of tire from the inner end Ea by a distance equal to groove bottom width GW1. The origin V is provided more preferably on the groove bottom 7S. Although the boundary 29 may be formed in the radial direction, that is, parallel to the tire's equatorial surface, it may be formed with an inclination away from or approaching to the tire's equator CL toward the inside in the radial direction, for example, as shown in FIG. 14.

As the rubber structure Y1, as shown in FIG. 15, one boundary 29 may be formed in the tread part T, and the first rubber part 25 is provided inside the boundary 29 in the axial direction of tire. In such case, the second rubber part 26 is formed only in one shoulder part 8, and the tire is, then, mounted with the shoulder part 8 in the outer side of the vehicle.

Figure 19:
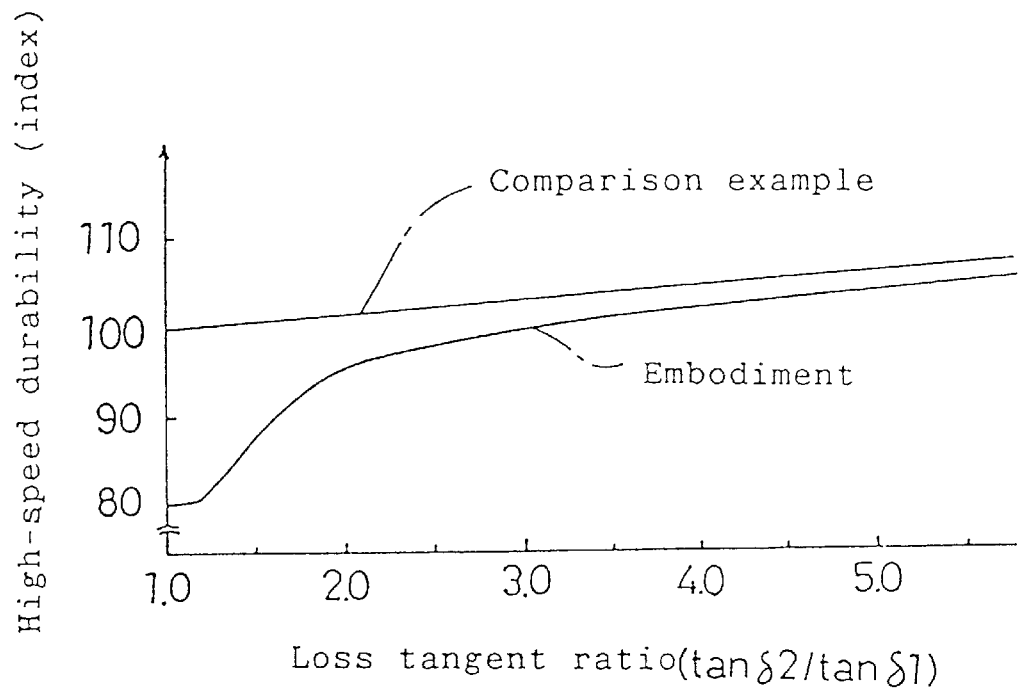
FIG. 19 is a diagram showing a relation between the loss tangent ratio tan δ 2/tan δ 1 and high-speed durability.

A tire of the embodiment with a tread rubber structure shown in FIG. 13 and a tire of a comparison example with a tread rubber structure shown in FIG. 22, wherein the tread rubber is dimensionally divided in a same width as that of FIG. 13, are prepared. And a relation between the ratio tan δ 2/tan δ 1 and high-speed durability was measured. As recognized from a measurement result shown in FIG. 19, in a tire with a tread profile of the invention, the high-speed durability is significantly increased in a range of 1.2 to 2.0 of the ratio tan δ 2/tan δ 1, and the high-speed durability can be improved to a level similar to that of a tire with conventional tread profile.

In other words, the rubber structure Y is most effective within the range of 1.2 to 2.0 of the ratio tan δ 2/tan δ 1, and the ratio tan δ 2/tan δ 1 is more preferably 2.0 to 6.0. The effect of increasing the high-speed durability is insufficient, if the ratio is less than 1.2, and physical properties between the first and second rubber compositions 22, 23 are excessively different, if it is more than 10, thus, a separation is induced between the compositions 22, 23. In addition, properties as a rubber is lacking, if the loss tangent tan δ 1 is less than 0.01, and the high-speed durability is insufficient, if it exceeds 0.35. Therefore, the loss tangent tan δ 1 is preferably within a range of 0.05 to 0.25. The loss tangent tan δ 2 is preferably 0.25 or more, more preferably 0.30 or more to obtain the steering stability required.

Here, the loss tangent is a value measured by using a visco-elasticity spectrometer prepared by Iwamoto Engineering Works in conditions of a temperature at 70 degree C., initial strain 10%, dynamic strain 2% and frequency 10 Hz.

As illustrated in FIG. 16, the vertical division type rubber structure Y2 is, for example, constructed by a base rubber 30 and a cap rubber 31. The base rubber 30 provides the first rubber part 25' placed in a radially inner region of the tread rubber 25 over the entire tread width through the central part 9, groove bottom 7S and shoulder part 8. The cap rubber 31 provides the second rubber part 26' covering the base rubber 30 by being placed radially outside thereof.

In the embodiment, the base rubber 30 has an outer part 30A which extends below the shoulder part 8 and groove bottom surface 7S with a generally constant low thickness and an inner part 30B which extends below the central part 9 with an outer convex surface generally parallel to the surface of the central part 9. Thus, the base rubber 30 has the highest thickness on the tire's equator CL, and a thickness ta of the base rubber from the belt layer 4 in the tire's equator CL, which is the highest thickness, is higher than a total thickness tb of the tread rubber from the belt layer 4 in the groove bottom 7S.

As shown in Table 2 of an example, a relation between the thickness ratio ta/tb and high-speed durability was measured by the embodiment tires 5 to 12 having a tread structure shown in FIG. 16. As for measuring conditions, the ratio tan δ 2/tan δ 1 was constantly set at 0.30/0.15 (=2.0), and the total thickness tb constantly at 3.0 mm. As shown in Table 2, it is found that the high-speed durability is increased, as the ratio ta/tb is increased. Specifically, the high-speed durability is substantially increased within a range of 1.0 to 1.3 of the thickness ratio ta/tb. It means that the rubber structure Y2 is most effective within 1.0 to 1.3 of the thickness ratio ta/tb, and the thickness ratio ta/tb is more preferably 1.3 or more. The total thickness tb is generally about 3 mm in a tire, and the thickness ratio ta/tb is, therefore, allowable to such range of thickness ta that the base rubber 30 is not exposed from an outer surface of tire.

With the rubber structure Y2, as shown in FIG. 17, the highest rubber thickness tc in an outer part 30A of the base rubber 30 may be increased to a value approximately equal to the rubber thickness ta, and the base rubber 30 may be formed by eliminating the outer part 30A and employing an inner part 30B only, as shown in FIG. 18.

In addition, in the embodiment, the shoulder part 8 and central part 9 are provided with lateral grooves 11, 12 extended substantially in the axial direction of tire to increase the wet grip performance. As illustrated in FIG. 3, for example, in the embodiment, a lateral groove 11 is employed in the shoulder part 8. The lateral groove 11 is extended from a position spaced from the circumferential groove 7 in the axial direction of tire toward the outside, and opens in the tread end. The shoulder part is prevented from reduction of rigidity by not connecting the lateral groove with the circumferential groove 7, and the wet grip performance is increased by allowing it to open in the tread end.

A lateral groove 12 of the central part 9 opens only in one end in the circumferential groove 7, and an inner side thereof in the axial direction of tire is terminated in the vicinity of the equator CL. By terminating the lateral grooves in the vicinity of the equator CL, the rigidity of central part is maintained, and the steering stability is assured. Groove bottoms surface 11a, 12a of the lateral grooves 11, 12 are approximately parallel with the belt layer 4. And inner end surfaces 11b, 12b of the lateral grooves 11, 12 in the axial direction are parallel to the tire's equator CL, or an angle β to a radial line Y are small angle of less than 20 degrees.

In such manner, reduction of the wet grip performance due to reduction in length of the lateral grooves as a tire is worn can be controlled. Other factors such as a circumferential pitch and depth may be selected according to the particular purpose.

Figure 24:
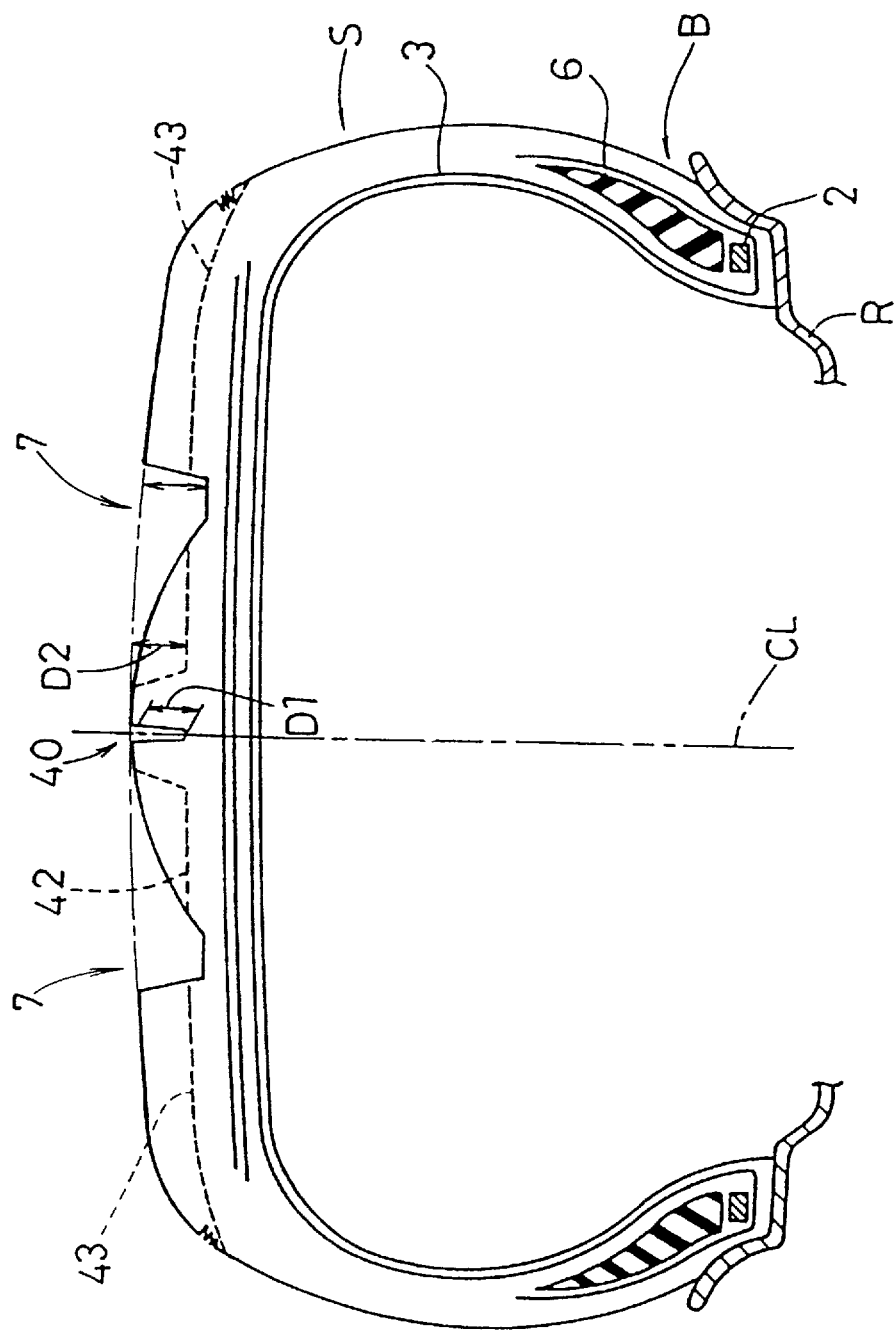
FIG. 24 is a sectional view showing an example of radiation grooves.
Figure 25:
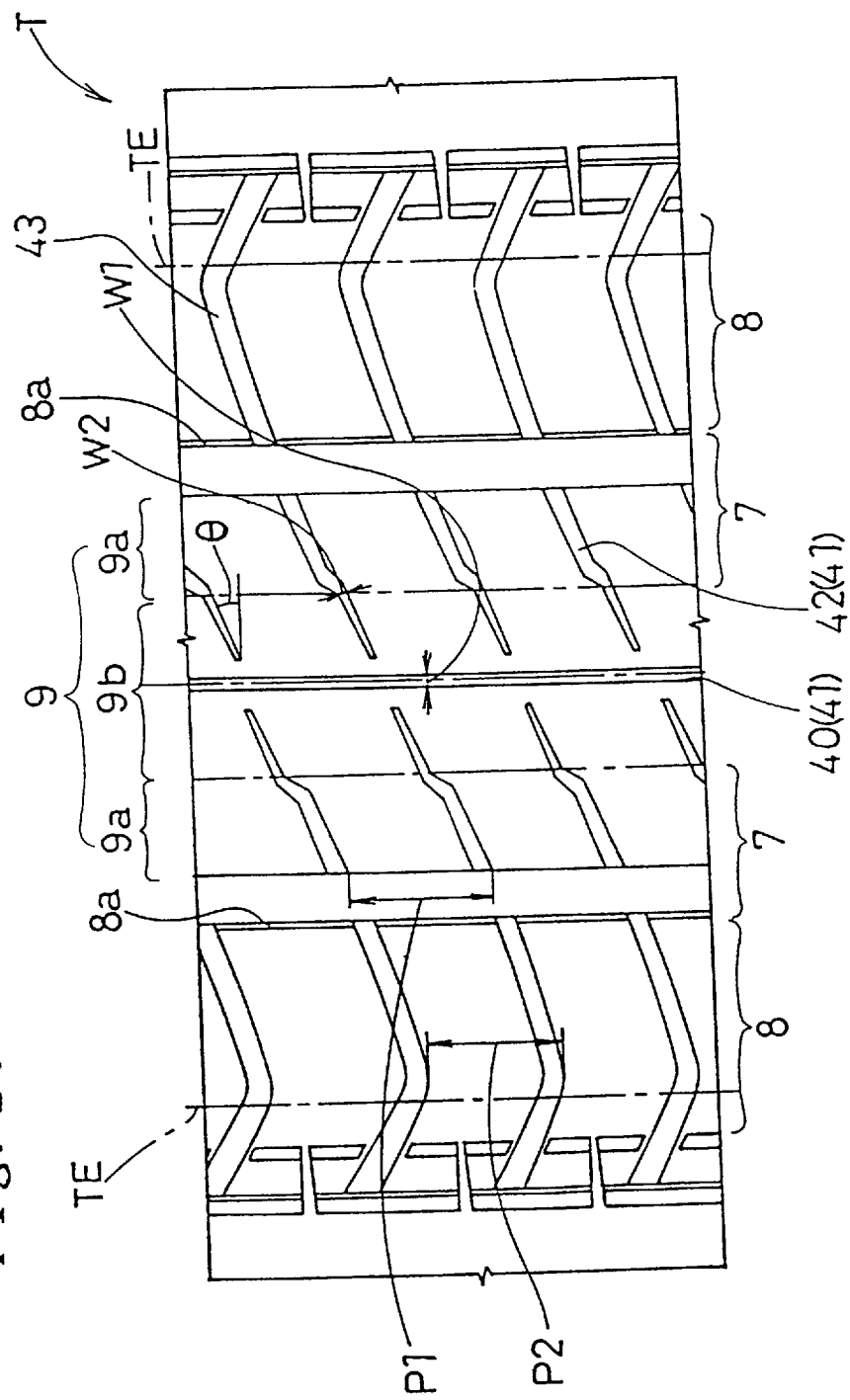
FIG. 25 is a partial flat view showing the radiation grooves in FIG. 24.

As a means for controlling heat generation in the central part 9, a radiation groove 41 including at least a circumferential radiation groove 40 for heat release may be formed in the central part 9, as shown in FIG. 24 and 25. Either one or both of the radiation groove 41 and the formation of tread rubber by the first and second rubber compositions as mentioned above, may be employed.

The radiation groove 41 comprises, in the embodiment, a circumferential radiation groove 40 and lateral radiation grooves 42. The circumferential radiation groove 40 is formed as a narrow groove continuously extending substantially on the tire's equator. The radiation groove 40 is capable of maintaining the pattern rigidity, while providing a heat radiation effect, by setting a groove depth D1 thereof at 0.4 to 0.9 times a groove depth D of the circumferential groove 7, and a groove width W1 at 5 mm or less. In the case that the groove width W1 is more than 5 mm, and the groove depth D1 is more than 0.9 times the groove depth D, the columnar resonance is caused. If the groove depth D1 is less than 0.4 times the groove depth D, the heat radiation effect is insufficient.

The lateral radiation groove 42 extends from a position in an inner end spaced from the circumferential radiation groove 40 toward outside in the axial direction of tire at an inclination θ of 20 degrees or more to the axial direction of tire, and an outer end thereof opens in the circumferential groove 7.

Thus, because the lateral radiation groove 42 is spaced from the circumferential radiation groove 40, the rigidity required for the central part 9 is maintained, and the steering stability is assured.

A groove depth D2 of lateral radiation groove 42 is similarly 0.4 to 0.9 times the groove depth D, and a groove width W2 is 3 mm or less at least in the central ground-contact surface 9b. In the case that the groove depth D2 is more than 0.9 times the groove depth D, the groove width W2 is more than 3 mm, and the inclination θ is less than 20 degrees, a pitch noise of the lateral radiation groove 42 is excessively high. If the groove depth D2 is less than 0.4 times the groove depth D, a sufficient heat radiation effect cannot be expected.

In the circumferential and lateral radiation grooves 40 and 42, an angle established by a groove wall in the grooves 40, 42 and a normal on the tread surface, that is, an inclination gradient of the groove wall is set at 15 degrees or less, more preferably 5 degrees or less, respectively, and a dimensional change of the radiation groove 41 due to wear of tire is thereby controlled.

Figure 26:
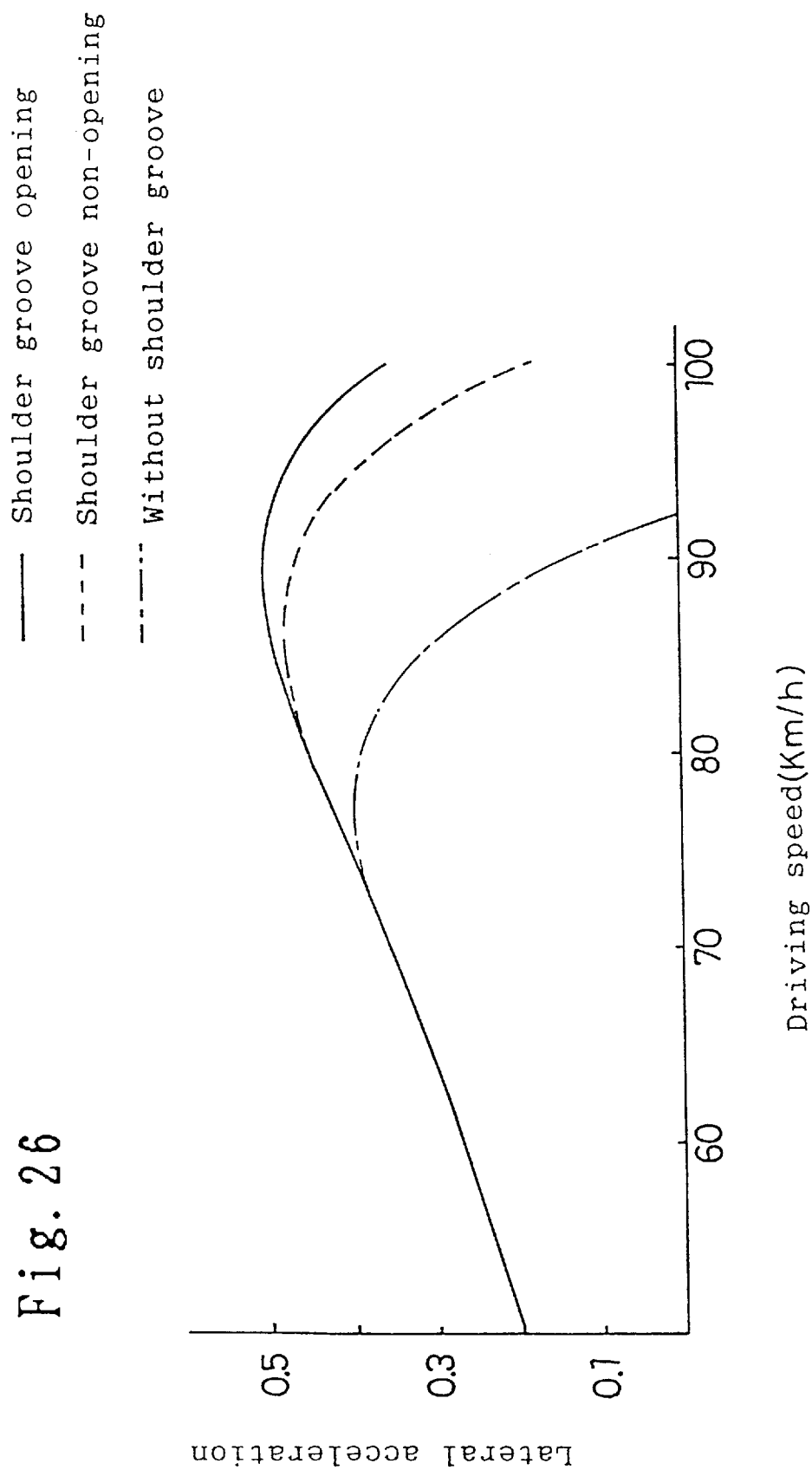
FIG. 26 is a graph showing a relation between the hydroplaning-inducing speed and the opening of the lateral radiation grooves.

In the embodiment, a shoulder groove 43 is additionally formed in the shoulder part 8. The shoulder groove 43 is a rag groove with an inner end thereof opening in the circumferential groove 7 and an outer end in the tread end. Thus, by opening it in the circumferential groove, the heat radiation effect is further increased, increase of temperature in the shoulder groove 8 is significantly reduced, the draining performance is enhanced, and hydroplaning performance in turning (lateral hydroplaning performance) is increased, for example, as shown in FIG. 26.

An average pitch length of a lateral groove in the circumferential direction of tire is generally about 30 mm, and a primary frequency at a speed of 60 km/h, for example, comes to be 500 to 600 Hz, thus, showing a coincidence with a frequency of noise peak in a tire with a tread profile having the convex central part 9. Therefore, in the embodiment, an average pitch length P1 of the lateral radiation groove 42 and an average pitch length P2 of the shoulder groove 43 are preferably set at 40 mm or more, respectively, so that a primary pitch frequency of the grooves 42, 43 are different from the noise peak.

Figure 27:
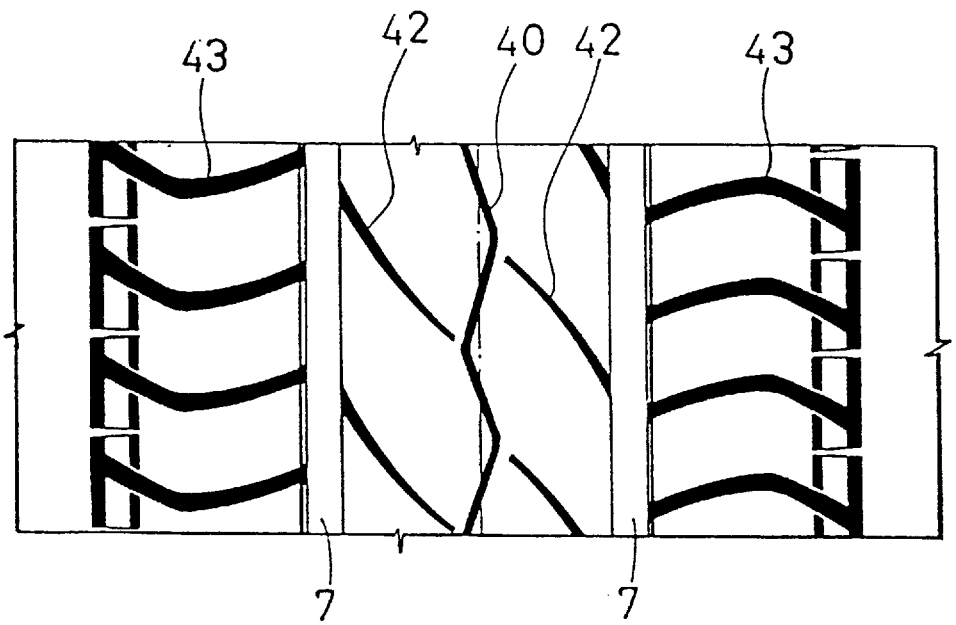
FIG. 27 is a flat view showing another example of radiation grooves.

FIG. 27 shows an example of the circumferential radiation groove 40 formed as a zigzag groove.

(EXAMPLE 1)

A tire of 205/55 R15 in size was produced according to specifications shown in Tables 1 and 2, and measured for the steering stabilities in straight-forward driving and cornering and the high-speed durability. The result of the measurement is shown in the tables. The performances are indicated by index, setting a conventional example 1 at 100, and a higher score shows better performance. Although a tire of embodiment 5 having a tread profile of the invention shows a significantly high effect in the aspect of tire noise and wet grip performance, as described, it is higher in heat generation in the tread center and inferior in the high-speed durability in comparison with a conventional tire with an identical tread rubber composition. By employing such tread profile and the tread rubber structure, as shown in embodiments 1, 2, 3 and 4, the steering stability is maintained, while the high-speed durability is increased.

In addition, as shown in embodiments 11 to 18, it is recognized that the durability is superior at a higher value of the thickness ratio ta/tb.

(EXAMPLE 2)

Tires of 205/55 R15 in size were produced according to specifications shown in Table 3, and measured for the noise, cornering power, a hydroplaning-inducing speed and high-speed durability. A result of the measurement is shown in the Table. Embodiments 21 to 26 have a tread profile of FIGS. 1 and 6, and conventional tires 21 to 23 have a tread profile of FIG. 20. The result is shown by index, setting a conventional tire 21 at 100. All tires were measured in the conditions described above, and a higher score shows better performance. It is observed that tire of the embodiment is superior in the hydroplaning characteristic, and capable of increasing the cornering power while reducing the noise, in comparison with a conventional example of tire similar in total groove width ratio. Moreover, because the tires of the embodiments 21 to 23 are provided with a radiation groove, it is recognized that increase of temperature in the tread is controlled, and the high-speed durability is increased to a similar level to that of a conventional tire.

(EXAMPLE 3)

Figure 28:
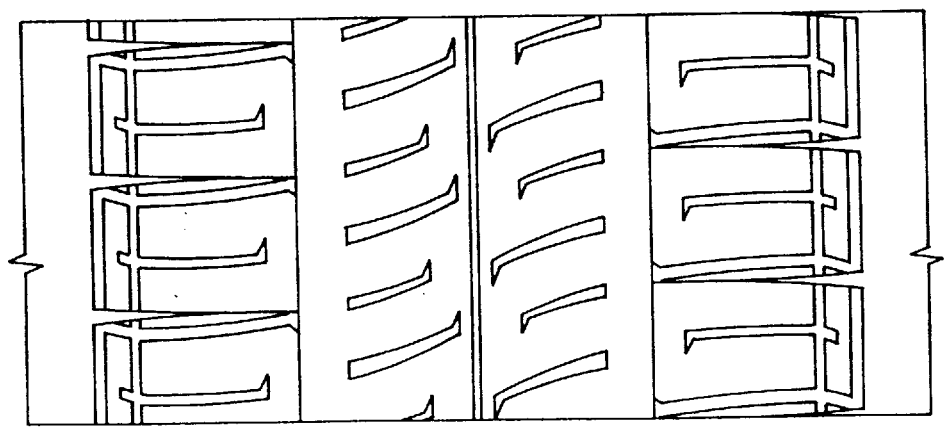
FIG. 28 is a flat view showing still another example of radiation grooves.

Tires of 205/55 R15 in size were produced with different tread patterns shown in FIG. 24, 28 and 29 according to specifications of Table 4, and the noise performance, durability, steering stability and residual CF were compared.

As shown in Table 4 and FIG. 31, a noise level (frequency not analyzed) is increased from that of an embodiment 31 by 0.9 dB in an embodiment 33 and 1.4 dB in an embodiment 32, that is relatively high. It is considered to be caused by such reason that a peak of primary frequency at 60 km/h is 420 Hz with a pattern of the embodiment 33, while a peak of primary frequency is 570 Hz with a pattern of the embodiment 32, and coincides with a peak (630 Hz) of the embodiment 32.

Figure 30:
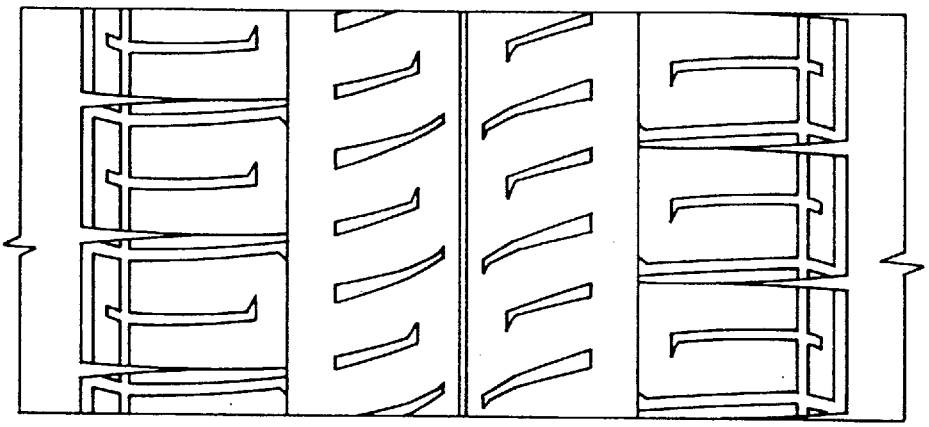
FIG. 30(A) is a flat view showing still another example of radiation grooves.
FIG. 30(B) is a flat view showing still another example of radiation grooves.
Figure 30:
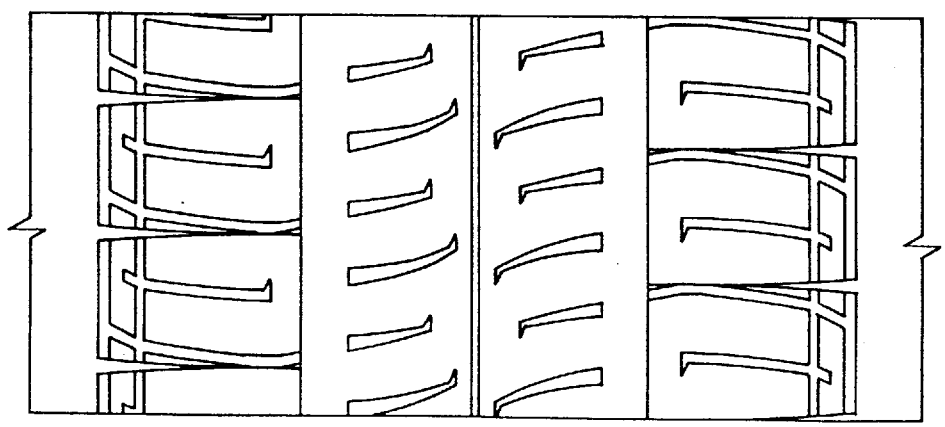

In terms of the high-speed durability, although the embodiment 33 is superior to the embodiment 32, both of them are at a practical level. As for the steering stability, the embodiment 33 is equivalent or slightly superior to the embodiment 32. Regarding the residual CF, although the embodiment 33 is in the negative side, it is higher than the embodiment 31. Therefore, in order to reduce the residual CF, it is preferable, for example, to displace a pattern limited by the tire's equator by 0.5 pitch in the circumferential direction, as shown in FIG. 30(A), or reduce an angle of the radiation groove to an axial direction, as shown in FIG. 30(B).

TABLE 1

Figure 23:
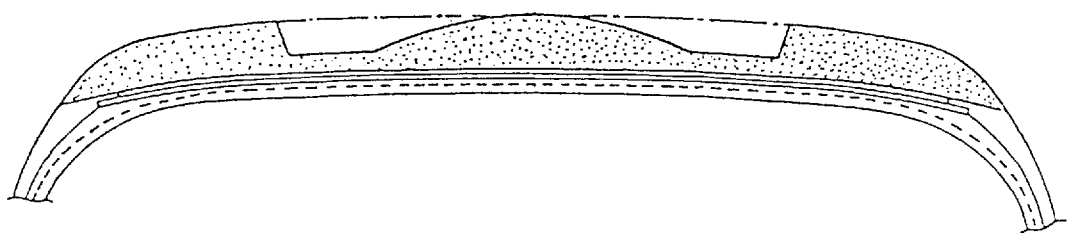
FIG. 23 is a sectional view showing a tread rubber structure of an embodiment tire 5, 6 and 7 in table 1.

| | | Embodiment | | | | | | | Conventional example 1 | Comparison example | | | |
|---|---|---|---|---|---|---|---|---|---|---|---|---|---|
| | | 1 | 2 | 3 | 4 | 5 | 6 | 7 | | 1 | 2 | 3 | 4 |
| | Ground-contact tread width TW (mm) | 168 | 168 | 168 | 168 | 168 | 168 | 168 | 168 | 168 | 168 | 168 | 168 |
| Circumferential grooves | Number of grooves | 2 | 2 | 2 | 2 | 2 | 2 | 2 | 4 | 4 | 4 | 4 | 4 |
| | Groove width GW (mm) | 32 | 32 | 32 | 32 | 32 | 32 | 32 | 16/16 | 16/16 | 16/16 | 16/16 | 16/16 |
| | Total groove width ΣGW (mm) | 64 | 64 | 64 | 64 | 64 | 64 | 64 | 64 | 64 | 64 | 64 | 64 |
| | Groove width ratio GW/TW | 19 | 19 | 19 | 19 | 19 | 19 | 19 | 9.5 | 9.5 | 9.5 | 9.5 | 9.5 |
| | Total groove width ratio ΣGW/TW | 38 | 38 | 38 | 38 | 38 | 38 | 38 | 38 | 38 | 38 | 38 | 38 |
| | Groove depth D (mm) | 10 | 10 | 10 | 10 | 10 | 10 | 10 | 10 | 10 | 10 | 10 | 10 |
| Tread rubber | Figure of tread rubber structure | FIG. 13 | FIG. 13 | FIG. 13 | FIG. 13 | FIG. 23 | FIG. 23 | FIG. 23 | FIG. 21 | FIG. 22 | FIG. 22 | FIG. 22 | FIG. 22 |
| | Characteristics of tread rubber | | | | | | | | | | | | |
| | Loss tan δ 1 | 0.30 | 0.30 | 0.30 | 0.30 | 0.30 | 0.25 | 0.15 | 0.30 | 0.30 | 0.30 | 0.30 | 0.30 |
| | Loss tan δ 2 | 0.25 | 0.15 | 0.10 | 0.05 | 0.30 | 0.25 | 0.15 | 0.30 | 0.25 | 0.15 | 0.10 | 0.05 |
| | Ratio tan δ 2/tan δ 1 | 1.2 | 2.0 | 3.0 | 6.0 | 1.0 | 1.0 | 1.0 | 1.0 | 1.2 | 2.0 | 3.0 | 6.0 |

TABLE 1-continued

|  | | Embodiment | | | | | | Conventional example 1 | Comparison example | | | |
| --- | --- | --- | --- | --- | --- | --- | --- | --- | --- | --- | --- | --- |
|  | 1 | 2 | 3 | 4 | 5 | 6 | 7 |  | 1 | 2 | 3 | 4 |
| High-speed durability (index) | 83 | 96 | 100 | 106 | 80 | 85 | 98 | 100 | 101 | 103 | 105 | 108 |
| Test by actual vehicle — Steering stability in straight-forwarding (index) | 99 | 97 | 96 | 94 | 100 | 94 | 80 | — | — | — | — | — |
| Steering stability in cornering (index) | 100 | 99 | 99 | 98 | 100 | 94 | 80 | — | — | — | — | — |

In a groove width A/B, A is a value of Circumferential groove width in the central side, and B in the shoulder side.

TABLE 2

|  |  | Embodiment | | | | | | | |
| --- | --- | --- | --- | --- | --- | --- | --- | --- | --- |
|  |  | 11 | 12 | 13 | 14 | 15 | 16 | 17 | 18 |
| Ground-contact tread width TW (mm) | | 168 | 168 | 168 | 168 | 168 | 168 | 168 | 168 |
| Circumferential grooves | Number of grooves | 2 | 2 | 2 | 2 | 2 | 2 | 2 | 2 |
| | Groove width GW (mm) | 32 | 32 | 32 | 32 | 32 | 32 | 32 | 32 |
| | Total groove width ΣGW (mm) | 64 | 64 | 64 | 64 | 64 | 64 | 64 | 64 |
| | Groove width ratio GW/TW | 19 | 19 | 19 | 19 | 19 | 19 | 19 | 19 |
| | Total groove width ratio ΣGW/TW | 38 | 38 | 38 | 38 | 38 | 38 | 38 | 38 |
| | Groove depth D (mm) | 10 | 10 | 10 | 10 | 10 | 10 | 10 | 10 |
| Tread rubber | Figure of tread rubber structure | FIG. 16 | FIG. 16 | FIG. 16 | FIG. 16 | FIG. 16 | FIG. 16 | FIG. 16 | FIG. 17 |
| | Characteristics of tread rubber | | | | | | | | |
| | Loss tan δ 1 | 0.30 | 0.30 | 0.30 | 0.30 | 0.30 | 0.30 | 0.30 | 0.30 |
| | Loss tan δ 2 | 0.15 | 0.15 | 0.15 | 0.15 | 0.15 | 0.15 | 0.15 | 0.15 |
| | Ratio tan δ 2/tan δ 1 | 2.0 | 2.0 | 2.0 | 2.0 | 2.0 | 2.0 | 2.0 | 2.0 |
| | Gauge ta/tb (mm) | 2.0/3.0 | 2.5/3.0 | 3.0/3.0 | 3.5/3.0 | 4.0/3.0 | 4.5/3.0 | 5.0/3.0 | 5.0/3.0 |
| High-speed durability (index) | | 80 | 82 | 85 | 93 | 102 | 108 | 113 | 120 |

TABLE 3

|  | Embodiment | | | | | | Conventional example | | |
| --- | --- | --- | --- | --- | --- | --- | --- | --- | --- |
|  | 21 | 22 | 23 | 24 | 25 | 26 | 21 | 22 | 23 |
| Ground-contact tread width TW (mm) | 168 | 168 | 168 | 168 | 168 | 168 | 168 | 168 | 168 |
| Circumferential grooves | | | | | | | | | |
| Number of grooves | 2 | 2 | 2 | 2 | 2 | 2 | 4 | 4 | 4 |
| Groove width GW (mm) | 25 | 32 | 38 | 25 | 32 | 38 | 9/9.5 | 12/13 | 16/16 |
| Total groove width ΣGW (mm) | 50 | 64 | 76 | 50 | 64 | 76 | 37 | 50 | 64 |
| Groove width ratio GW/TW | 15 | 19 | 22.6 | 15 | 19 | 22.6 | 5.5 | 7.5 | 9.5 |
| Total groove width ratio ΣGW/TW | 30 | 38 | 45 | 30 | 38 | 45 | 22 | 30 | 38 |
| Groove depth D (mm) | 10 | 10 | 10 | 10 | 10 | 10 | 10 | 10 | 10 |
| Circumferential radiation groove | | | | | | | | | |
| Groove width W1 (mm) | 2.5 | 2.5 | 2.5 | — | — | — | — | — | — |
| Groove depth ratio D1/D | 0.75 | 0.75 | 0.75 | — | — | — | — | — | — |
| Lateral radiation groove | | | | | | | | | |
| Groove width W2 (mm) | 1.8 | 1.8 | 1.8 | — | — | — | — | — | — |
| Groove depth ratio D2/D | 0.65 | 0.65 | 0.65 | — | — | — | — | — | — |
| Shoulder groove | | | | | | | | | |
| Groove width W3 (mm) | 3.7 | 3.7 | 3.7 | 3.7 | 3.7 | 3.7 | 3.7 | 3.7 | 3.7 |
| Groove depth ratio D3/D | 0.84 | 0.84 | 0.84 | 0.84 | 0.84 | 0.84 | 0.84 | 0.84 | 0.84 |
| Curvature of radius R1 mm | — | 95 | 85 | — | 95 | 85 | — | — | — |
| Curvature of radius R2 mm | 520 | 520 | 520 | 520 | 520 | 520 | 520 | 520 | 520 |
| Curvature of radius R3 mm | 40 | — | — | 40 | — | — | — | — | — |
| Curvature of radius R4 mm | 140 | — | — | 140 | — | — | — | — | — |
| Noise level dB (A) | 73.8 | 72.5 | 71.5 | 73.8 | 72.5 | 71.5 | 73.8 | 74.5 | 75.0 |
| High-speed durability (ECE30) | | | | | | | | | |
| <Kph> | 270 | 280 | 290 | 240 | 250 | 250 | 290 | 290 | 290 |
| <min> | 15 | 10 | 5 | 5 | 1 | 15 | 10 | 5 | 5 |

TABLE 3-continued

|  | Embodiment | | | | | | Conventional example | | |
|---|---|---|---|---|---|---|---|---|---|
|  | 21 | 22 | 23 | 24 | 25 | 26 | 21 | 22 | 23 |
| Cornering power | 97 | 94 | 89 | 97 | 94 | 89 | 100 | 92 | 86 |
| Hydroplaning-inducing speed | 118 | 137 | 145 | 118 | 137 | 145 | 100 | 114 | 130 |

In a groove width A/B of conventional tires 1 to 3, A is a value of Circumferential groove width in the central side, and B in the shoulder side

TABLE 4

|  | Embodiment 31 | Embodiment 32 | Embodiment 33 | Embodiment 34 | Embodiment 35 |
|---|---|---|---|---|---|
| Tread Pattern | Plane | FIG. 25 | FIG. 28 | FIG. 29 | FIG. 29 |
| Band ply | — | — | — | — | exist |
| Noise level | 70.7$^{dB}$ | 72.1$^{dB}$ | 71.6$^{dB}$ | 70.5$^{dB}$ | 70.9$^{dB}$ |
| High-speed durability | 250 km/h . . . 7 min | 270 km/h . . . 15 min. | 280 km/h . . . 20 min. | 270 km/h . . . 16 min. | 280 km/h . . . 7 min. |
| Durability | 30,000 km no fail | 30,000 km no fail | 30,000 km no fail | 30,000 km no fail | 30.000 km no fail |
| Residual CF | −55.5 | +8.6 | −3.2 | +1.1 | +20.30 |

What is claimed is:

1. A pneumatic tire comprising a tread part having two circumferential grooves continuously extending in the circumferential direction, each of the circumferential grooves having an axially inner bottom edge and an axially outer bottom edge, one of the circumferential grooves being on one side of the tire's equator and the other of the circumferential grooves being on the other side of the tire's equator so as to divide the tread part into a pair of shoulder parts, and a central part, the central part being located between the axially inner bottom edges of the circumferential grooves; wherein the central part has a surface composed of at least one convex curve, said surface of the central part including:
a pair of inner groove walls, each of the inner groove walls being a convex arc and extending inward in the tire's axial direction along a curve convexed outwardly in the radial direction from one of the inner bottom edges, and
a central ground-contact arc surface smoothly connected between the pair of inner groove walls and substantially in contact with a virtual tread line connected between outer surfaces of the shoulder parts, and a tread rubber of the tread part is divided into
a first rubber part including a first rubber composition of a loss tangent tan δ1 at 0.01 to 0.35 and provided substantially only in a radially inner region of the central part so as to extend radially outward from a belt layer, and
a second rubber part including a second rubber composition of a loss tangent tan δ2 at 1.2 to 10 times said loss tangent tan δ1 and provided in the tread part other than the first rubber part so as to completely cover the axial extent of the first rubber part and extend radially outward from abutment with the first rubber part and from abutment with the belt layer in each of said shoulder parts to terminate in a tread surface,
each said loss tangent being measured by using a visco-elasticity spectrometer in conditions of a temperature at 70° C., initial strain 10%, dynamic strain 2% and frequency 10 Hz, and
a thickness of the first rubber part at the tire's equator is larger than a total rubber thickness of the second rubber part from the belt layer to the bottom of a circumferential groove.

2. The pneumatic tire according to claim 1, wherein a boundary between the first and second rubber parts has a radially outer surface having approximately the same shape as said surface of the central part.

3. A pneumatic tire comprising
a tread part provided on each side of the tire's equator with a continuous circumferential groove so as to divide the tread part into a pair of shoulder parts and a central part, each of the circumferential grooves having a bottom with an axially inner edge and an axially outer edge, said central part being located between the axially inner edges,
the surface of the central part configured by a convex curve, which is selected from a group consisting of a single radius curve and an elliptic curve, said convex curve having a radius in the range of from 0.5 to 1.5 times the ground-contact tread width and the central part being substantially in contact with a virtual tread line connected between outer surfaces of the shoulder parts, and the central part has a width of about 40% to 55% of the ground-contacting tread width,
each said circumferential groove having an axially outer groove wall extending steeply at an angle of 0 to 40 degrees to the tire radial direction so that each of the shoulder parts is provided at the axially inner end with an edge,
a tread rubber disposed radially outside a belt layer to define the tread part, the tread rubber including a first part having a loss tangent tan δ1 of from 0.01 to 0.35 and a second part having a loss tangent δ2 of from 1.2 to 10 times said loss tangent tan δ1, each of said loss tangents being measured in conditions of a temperature at 70° C., initial strain 10%, dynamic strain 2% and frequency 10 Hz, wherein
the first part is disposed substantially only in a radially inner region of the central part so as to extend radially outward from the belt layer and such that the radially outer surface of the first part is approximately the same configuration as the surface of the central part,
the second part is disposed so as to completely cover the first part and extend radially outward from abutment with the first rubber part and from abutment with the belt layer in each said shoulder part to a tread surface, and the rubber thickness of the first part measured at the tire's equator is larger than the rubber thickness of the second part from the belt layer to the bottom of a circumferential groove.

4. The pneumatic tire according to claim 3, wherein the central part is provided with a circumferential radiation groove continuously extending along the tire's equator, the circumferential radiation groove having a groove depth of 0.4 to 0.9 times the groove depth of the circumferential grooves and a groove width of not more than 5 mm.

5. The pneumatic tire according to claim 4, wherein the central part is provided in at least one axial side of the circumferential radiation groove with lateral radiation grooves having a groove depth of 0.4 to 0.9 times the groove depth of the circumferential grooves and an inclination of an angle of not less than 20 degrees to the tire's axial direction, each of said lateral radiation grooves being spaced at an axially inner end thereof from the circumferential radiation groove, being open at an axially outer end thereof to one of said circumferential grooves, and having a groove width of not more than 3 mm at least in a ground contacting surface of the central part.

6. The pneumatic tire according to claim 5, wherein the shoulder parts are provided with shoulder grooves having an axially inner end opening to one of the circumferential grooves and an axially outer end opening to a tread edge.

7. The pneumatic tire according to claim 4, wherein the shoulder parts are provided with shoulder grooves having an axially inner end opening to one of the circumferential grooves and an axially outer end opening to a tread edge.

* * * * *